United States Patent
Atilano et al.

(10) Patent No.: US 8,253,263 B2
(45) Date of Patent: Aug. 28, 2012

(54) WAVE-POWER SYSTEM FOR EXTRACTING SIMULTANEOUSLY BOTH POTENTIAL AND KINETIC ENERGY AT VARIABLE SIGNIFICANT WAVE HEIGHTS AND PERIODS

(76) Inventors: Alvaro Atilano, Caracas (VE); Carlos Zarate, Puerto Ordaz (VE); Jaime Zarate, Puerto Ordaz (VE); Mario Favaretto, Los Teques (VE); Felix Tovar, Los Teques (VE); Rafael Uzcategui, Caracas (DE)

( * ) Notice: Subject to any disclaimer, the term of this patent is extended or adjusted under 35 U.S.C. 154(b) by 690 days.

(21) Appl. No.: 12/430,042

(22) Filed: Apr. 24, 2009

(65) Prior Publication Data

US 2009/0212571 A1    Aug. 27, 2009

Related U.S. Application Data

(63) Continuation-in-part of application No. 11/681,816, filed on Mar. 5, 2007, now Pat. No. 7,525,214.

(60) Provisional application No. 60/813,762, filed on Jun. 14, 2006.

(51) Int. Cl.
    *F03B 13/12* (2006.01)
(52) U.S. Cl. .......................................... 290/53; 290/42
(58) Field of Classification Search .................. 290/53, 290/42, 54, 43
    See application file for complete search history.

(56) References Cited

U.S. PATENT DOCUMENTS

| | | | | |
|---|---|---|---|---|
| 5,929,531 A * | 7/1999 | Lagno | ............................ | 290/53 |
| 6,930,406 B2 * | 8/2005 | Montgomery | .................. | 290/42 |
| 7,339,285 B2 * | 3/2008 | Negron Crespo | ............... | 290/53 |
| 7,385,301 B2 * | 6/2008 | Hirsch | ............................ | 290/42 |
| 7,420,287 B2 * | 9/2008 | Smushkovich | ................ | 290/42 |
| 7,768,143 B2 * | 8/2010 | McCague et al. | ............... | 290/42 |
| 7,791,213 B2 * | 9/2010 | Patterson | ........................ | 290/53 |
| 7,952,218 B2 * | 5/2011 | Welch et al. | .................... | 290/53 |
| 7,963,111 B2 * | 6/2011 | Doleh et al. | .................... | 60/497 |
| 2007/0018458 A1 * | 1/2007 | Martinez | ......................... | 290/53 |

* cited by examiner

*Primary Examiner* — Nicholas Ponomarenko
(74) *Attorney, Agent, or Firm* — Robert Platt Bell

(57) ABSTRACT

A wave energy conversion system or device includes a float and base on top of which there is a power take-off system. The float, its base and the machine room are inserted in a main column supported by legs and corresponding leg supports on the bottom floor in shallow waters (seas or lakes). In deeper waters, the main column may be supported by column supports attached to an underwater float. The machine room is separated of the float frame through a rotary joint which allows the float and base to rotate in any horizontal direction while maintaining the machine room fixed in the same horizontal direction. The rotary joint separating the float frame and the machine room also allows for the vertical up and down movement when interacting with incoming waves. The distance between the machine room and the float frame is always the same. The device includes flaps or blades for the absorption of kinetic energy derived from the back and forth movement of water generated by waves. The device extracts potential energy of the wave from the up and down movement of the floating structure through a power take-off system in the machine room.

16 Claims, 22 Drawing Sheets

WAVE-POWER SYSTEM FOR EXTRACTING SIMULTANEOUSLY BOTH POTENTIAL AND KINETIC ENERGY AT VARIABLE SIGNIFICANT WAVE HEIGHTS AND PERIODS

CROSS-REFERENCE TO RELATED APPLICATIONS

The present application is a Continuation-In-Part, of U.S. patent application Ser. No. 11/681,816, filed on Mar. 5, 2007 now U.S. Pat. No. 7,525,214, incorporated herein by reference in its entirety; application Ser. No. 11/681,816 in turn claims priority from Provisional U.S. Patent Application Ser. No. 60/813,762, filed on Jun. 14, 2006 and also incorporated herein by reference in its entirety.

FIELD OF THE INVENTION

The present invention relates to heaving-buoy and oscillating wave surge wave-energy converters. In particular, the present invention is directed toward a physical configuration and mechanical transmission power take-off system for the simultaneous extraction of both the potential and kinetic energy contained in waves of a large range of significant wave heights and wave periods. The invention is a converter that changes both random vertical and horizontal movement of waves into high-speed rotational movement that can be used for electric generating power or any other possible power use (rotary pumps, desalinization, and other equivalent devices that utilize rotary motion to function) at a large range of significant wave heights and wave periods.

BACKGROUND OF THE INVENTION

There are several reasons that have made wave energy converters more attractive since the beginning of the present decade. First, there are global warming issues—carbon dioxide emissions must be reduced in many industrialized countries due to ratification of the Kyoto Convention, and its future successor being discussed in Copenhagen 2009. Also, recent hurricane seasons have created growing concerns among some industrialized countries about climate change. The Fourth Report of Intergovernmental Panel on Climate Change Convention (IPCCC) release in 2007 has clearly stated that anthropogenic activities are partially responsible for increase emissions of green house gases and the increase in the average global temperatures. Cuts in greenhouse gas emissions may ultimately be needed to stabilize atmospheric concentrations of the gases and avert serious climate disruptions. This reduction in greenhouse gases may require a global transition to renewable energy sources and improvements in energy efficiency.

Secondly, a dwindling supply of peak oil reserves and growing demand of oil by large nations such as China and India, in addition to growing political tensions in oil producing countries, have increased oil prices tremendously. It is expected that during the expected period of maturity of wave technology (2009-2015) and consolidation of its market (up to 2025), the price of oil is projected to be near or above US$ 50 per barrel. This scenario makes the development of alternative energy technology very viable.

Others issues such as declining coal use, increased opposition to hydroelectric dams, increasing demand for renewable energy sources, and deregulation of energy markets may contribute to the development of alternative energy technology, and in particular, ocean and wave energy converters.

The reduction of emissions of green house gases (GHG) and relevance and importance of the introduction and use of renewable energy technologies, especially for clean electric power generation, to contribute to these reductions are by now obvious and need not to be explained more extensively here. Within the new technologies that are being developed in the last few years for clean power generation, those based on marine renewable resources (especially waves) have great potential, due to its concentrated power and high predictability. It is expected that the average growth in electricity generation based on marine renewable resources (wave and tidal) will be around 12% in the period 2007-2015. Realizing this, countries like Ireland and Portugal have developed national strategies for the introduction of marine renewable power and others, like New Zealand and the UK, created funds and other incentives for the same purpose. The US, a latecomer in this sector, has even go further and passed the "Energy Independence and Security Act of 2007" in December 2007 with a specific section (Subtitle C) on Marine and Hydrokinetic research and development. Additionally, in April 2009, the US has taken a major step to boost marine renewable energy by issuing a long-awaited set of rules that will significantly help the development of offshore wave energy along the US coastlines.

Until recently, all wave energy conversion (WEC) technologies were being developed in industrialized countries with high-energy intensity seas (average wave height 2 meters and above) and were conceived to ultimately work in central grid-connected generation wave farms or parks. Developing marine renewable energy technologies in these temperate weather countries has let to conceptualization of technologies with high capital costs per installed kW capacities due to survival features in the designs (Pelamis, for example, one of the most well known offshore wave energy technologies, is designed to survive waves of up to 28 meters high. See, www.Pelamiswave.com, incorporated herein by reference). This has let European groups such as WaveNet, to infer that most of the shoreline/near-shore wave power devices start to become economically competitive at wave power levels of 40 kW/m (i.e., average wave height of three meters @ periods of ten seconds) and above, and that some of the offshore wave power devices also start to become economically competitive at offshore wave power levels of 30 kW/m (i.e., average wave height of. 2.7 meters @ periods of 10 seconds) and above.

Since most developing countries have low energy intensity seas, especially those in the tropical regions, with average wave power levels of 3 to 15 kW/m, the above mentioned issue results in an erroneous tendency within the renewable wave energy technology developers in industrialized countries to believe that the majority tropical countries are not or will not be beneficiaries of this type of technology because of their low energy intensity seas.

Most of the technologies for wave energy conversion that have been developed are based on the extraction of either the potential energy (that generates the up and down movement of water molecules) contained in waves (i.e., heaving buoys, point absorbers) or the kinetic energy (that generates the back and forth movement of water molecules) contained in waves (i.e., oscillating wave surge converters). Very few devices are conceived to extract both the potential energy and kinetic energy of waves.

To be able to work economically in seas of lower energy intensity, wave energy conversion technology needs to be more efficient in the extraction of energy from waves. This requires the development of devices that extract simultaneously both the potential energy and the kinetic energy from waves.

The motion of ocean waves has long been considered a major potential resource of both potential and kinetic energy. At the same time, wave energy performance measures are characterized by diffuse energy, enormous forces during storms, and variation over wide range in wave size, length, period, and direction. Techniques for changing the random forces generated by waves into useful energy in an apparatus may be through one or more of the following power take-off systems, including pneumatic systems, hydraulic systems, piezoelectric systems, electrical systems, and mechanical systems.

These Prior Art systems are not conceptualized to simultaneously extract both the potential energy and the kinetic energy contained in waves. The majority of these systems are design to extract only the potential energy contained in the up and down movement of water molecules in the wave. Very few of the systems are design to extract the kinetic energy derived from the back and forth movement of water molecules in the wave. Also, these Prior Art systems have no self-oriented capability to position themselves to absorb the maximum amount of energy from waves and thus optimize energy production.

The aforementioned problems or challenges are precisely those which the present invention is oriented to solve.

SUMMARY OF THE INVENTION

It is the main objective of the present invention to convert simultaneously both the mechanical potential and kinetic energy contained in the slow and random movement of waves into a more useful form of constant high speed rotation at a large range of different wave heights and periods.

It is another objective of the present invention to absorb the maximum amount of energy per wave crest in normal sea conditions.

It is another objective of the present invention to absorb the minimum amount of energy per wave crest in abnormal or stormy sea conditions when the design parameters of the device are being surpassed.

It is another objective of the present invention to optimize the simultaneous extraction of both the potential energy and the kinetic energy contained in water waves by separating the energy extracting components of the device an optimal horizontal distance in order to synchronize them to both the vertical and horizontal movement of water molecules.

It is another objective of the present invention to provide a device that may survive harsh weather or high waves.

In order to accomplish these objectives there is provided a wave energy conversion system or device with two main configurations. Both configurations are comprised of a float and its corresponding base on top of which there is a power take-off system inside a machine room totally isolated from the sea environment. The float, its base and the machine room are inserted in a main column or beam that is supported by legs and its corresponding leg supports on the bottom floor in shallow waters (seas or lakes). In deeper waters, the main column or beam is supported by column supports attached to an underwater float. The underwater float may be attached to the bottom floor (sea bed of lake bed) through beams or anchored through lax or tight anchoring. The machine room is separated of the float frame through a rotary joint that has the characteristic of allowing the float and its corresponding base to rotate in any horizontal direction while maintaining the machine room fixed in the same horizontal direction. The rotary joint separating the float frame and the machine room also allows for the vertical up and down movement when interacting with incoming waves of the machine room, and the float and its corresponding base. The distance between the machine room and the float frame is always the same. The device extracts potential energy of the wave from the up and down movement of the floating structure through a power take-off system in the machine room.

In normal sea conditions and in order to maintain the floating frame oriented in a manner to absorb the greatest amount of energy per wave crest (longitudinal axis of the float parallel to the wave crest), the frame or hull may have a system of fins, which interact with incoming waves and maintain a desired orientation. This orientation may also be obtained manually by lax anchoring the float and its base parallel to the predominant wave crest line.

During abnormal sea conditions when the rotational speed of the power take off system surpasses a desired set speed, the design capacity of the wave energy converter is being surpassed and the fins may take the position to maintain the longitudinal axis of the float frame perpendicular to incoming waves, thus allowing the WEC to absorb the minimum amount of energy per wave crest. This orientation may also be obtained manually by lax anchoring the float and its base perpendicular to the predominant wave crest line.

In the first configuration of the device, and in order to extract the kinetic energy of waves, flaps or blades hanging from the float frame are placed at both sides from the center of the float. These flaps or blades move back when hit by an incoming wave and forth when a wave has passed. In this configuration, the device extracts kinetic energy of the wave from the back and forth movement of the flaps or blades attached to the floating structure through gears that transmit the movement to a power take off system in the machine room. The flaps or blades move up and down with the float since they are attached to the float frame.

In the second configuration of the device, and in order to extract the kinetic energy of waves, flaps or blades are attached to the front leg of the main column or beam at the sea bottom and placed at both sides from this leg, in the case of shallow waters. In the case of deep waters, these flaps or blades are place in front of the main column and attached to the underwater float. These flaps or blades move back when hit by an incoming wave and forth when a wave has passed. In this configuration, the device extract kinetic energy of the wave from the back and forth movement through a system of gears that conduct this back and forth movement to the main column or beam and them to the power take off system in the machine room. The flaps or blades do not move up and down with the float since they are attached to the front leg of the main column or beam at the sea bottom in the case of shallow waters, or to the underwater float in the case of deeper waters. In the second configuration, the flaps or blades for extracting kinetic energy may be place at an optimal horizontal distance from the main column or beam, and therefore, from the float for extracting potential energy of the wave, in order to synchronize the movement of these energy extracting components of the device to make energy extraction more efficient.

The invention is conceived primarily for offshore and near-shore locations. However, the power take-off system may be used in onshore locations if location conditions allow. For offshore and near-shore locations with shallow depths, the main column or beam of the WEC may be fixed directly to the seabed (or lake bed for large lakes). For offshore locations with deep depths, the main column or beam of the WEC may be fix to an underwater float frame structure.

Dimensions of the device may be varied to suit prevalent sea conditions of the locality where deployed.

The construction of the device is similar to the construction of buoys and small ships and device is thus very robust.

The present invention does not have a fixed "design wave height" or "design wave period" but actually has a "design wave height range" and a "design wave period range".

DETAILED DESCRIPTION OF THE INVENTION

The following Figures are not to scale. The actual dimension and/or shape of each of the device components may vary. Only important details of the device are shown, however one of ordinary skill in the art can appreciate how the overall device may be constructed, without undue experimentation. The device may be constructed using standard ship building methods and materials or any appropriate materials and methods to allow efficiency and survivability.

Figure 1:
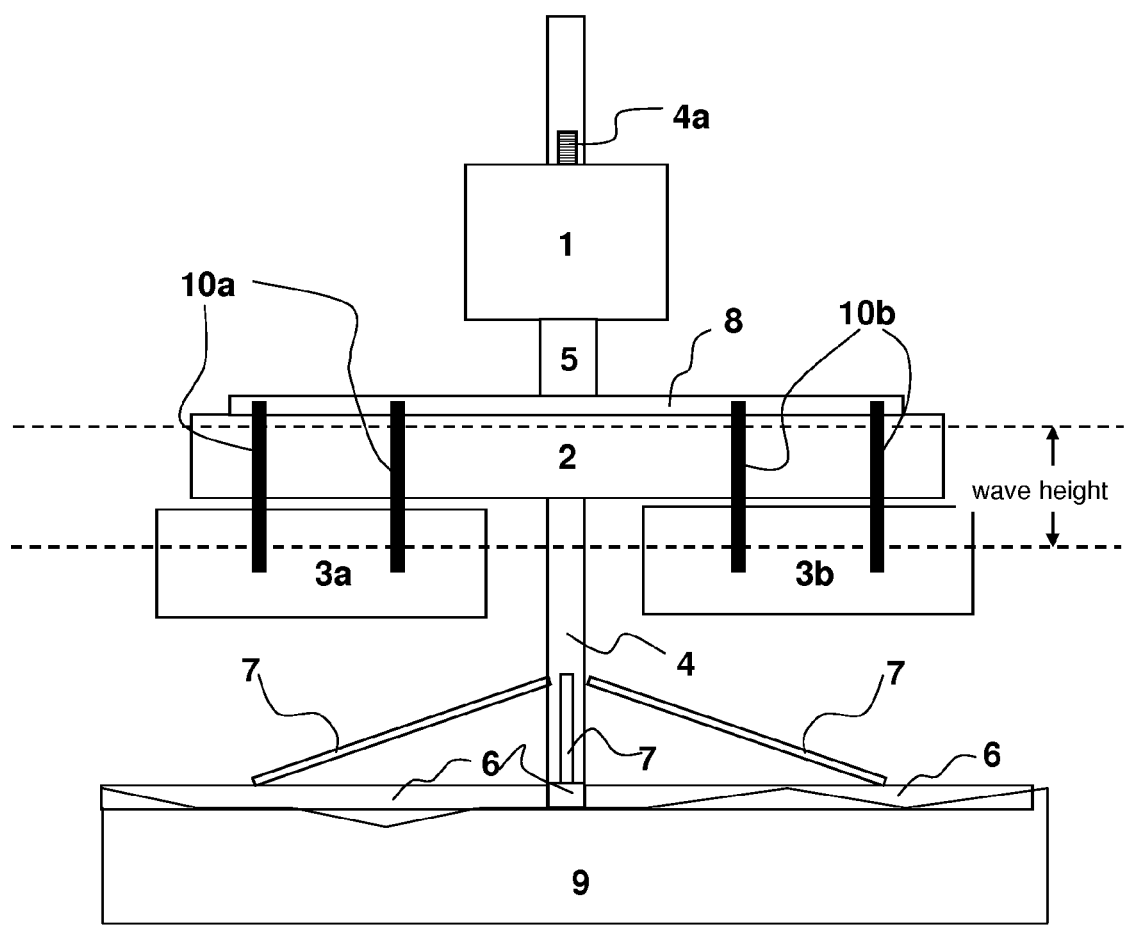
FIG. 1 is a general front view of the first configuration (flaps or blades hanging from the float frame) of the wave energy converter of the present invention.
Figure 2:
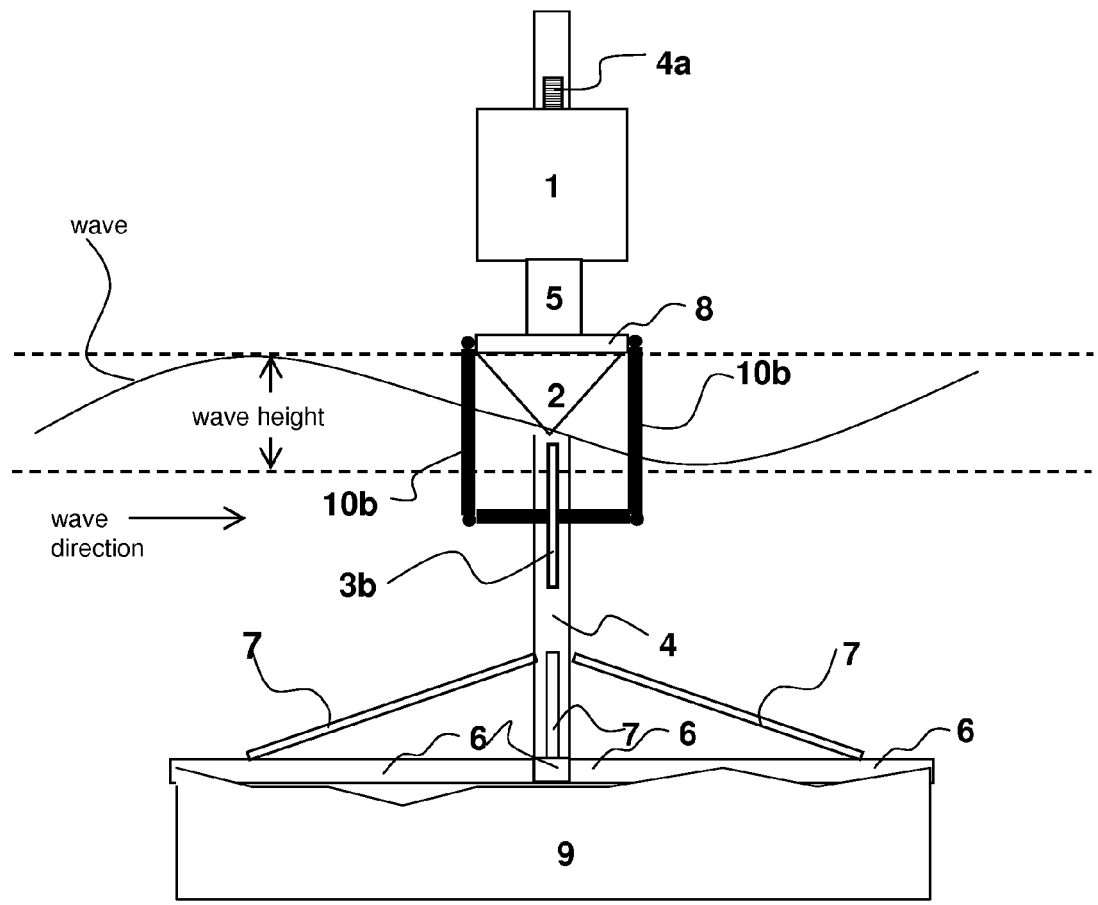
FIG. 2 is a general side view of the first configuration of the wave energy converter of the present invention.

FIG. 1 is a general front view of the first configuration (flaps or blades hanging from the float frame) of the wave energy converter of the present invention and FIG. 2 is a general side view of the first configuration of the wave energy converter of the present invention. Note the movement and direction of the waves as illustrated in FIG. 2. Referring to FIGS. 1 and 2, the apparatus is composed of a machine room 1 which encloses a power take off system (not shown). Machine room 1 is built in such a manner as to keep water out in any sea condition. Machine room 1 may comprise an actual room housing machinery for converting linear motion to rotary motion and then converting such rotary motion to electrical power. Electrical power may then be transmitted to shore using an electrical cable, as is known in the art. In smaller applications, machine room 1 may comprise a compartment or the like, for housing machinery, similarly sealed against the environment. The term "machine room" should not be construed as limiting the application to a physical room.

Below machine room 1 separate by a rotary joint that will be described later, there is a float 2 that serves two purposes. One purpose is to keep machine room 1 always above the water line to avoid flooding or water leakage. The other purpose is to serve as the component for extracting potential energy from waves. When an incoming wave interacts with float 2, float 2 starts to rise, being pushed by the floating force generated by the water it displaces. This upward movement of float 2 moves machine room 1 upward the same distance.

When a wave passes float 2, float 2 starts to fall, being pulled by the gravity force generated by the weights of float 2 and all structures above water. This downward movement of float 2 moves machine room 1 downward the same distance. The power take off (PTO) system within machine room 1 (not shown) converts the up and down random movement of waves to high speed rotational movement that may end up, in the case of electric power generation, moving a series of generators (not shown). Also seen in both FIGS. 1 and 2 are the flaps or blades (3a and 3b) for extracting kinetic energy from waves hanging from float frame 8. In FIG. 1 can be seen that flap or blade 3a is the one positioned to the left of the device and flap or blade 3b is the one positioned to the right of the device. These flaps or blades 3a and 3b are attached to float frame 8 through hinges 10a and 10b respectively as seen in FIG. 1. FIG. 2 shows the hinges 10b supporting flap or blade 3b.

The power take-off system of machine room 1 may comprise, for example, the power take-off and transmission system disclosed in parent U.S. patent application Ser. No. 11/681,816, filed on Mar. 5, 2007 now U.S. Pat. No. 7,525,214, incorporated herein by reference in its entirety, and for sake of clarity is not shown here. Other types of power take off systems which convert linear motion to rotary motion may also be used within the spirit and scope of the present invention.

Also shown in FIGS. 1 and 2 is the main column or beam 4 of the device that is attached to legs 6 and corresponding supports 7 for placing the device at the sea or lake bottom 9. In these Figures is also shown rotary joint 5 that separates machine room 1 from float frame 8 and that is design to allow the float and its corresponding base to rotate in any horizontal direction while maintaining the machine room fixed in the same horizontal direction. Finally, FIGS. 1 and 2 show a gear rack or chain, or equivalent component 4a, in this first configuration, acts as the fixed member of the device, not moving up and down with passing waves. The PTO system extracts energy through its pinions that while moving up and down due to the incoming and passing waves, interact with the gear rack or chain, or equivalent component 4a that remain fixed to the main column or beam.

Figure 3:
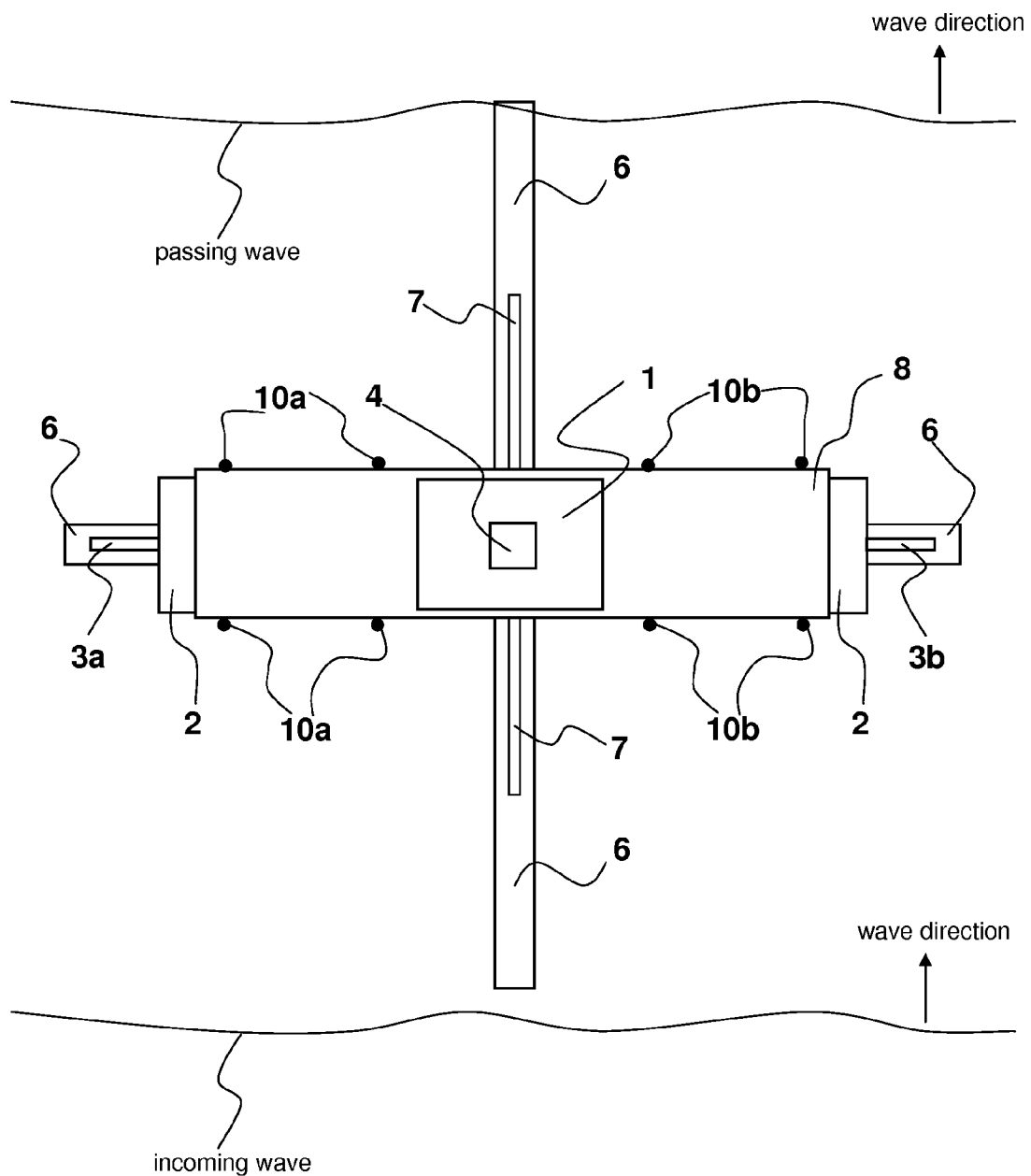
FIG. 3 is a general top view of the first configuration of the wave energy converter of the present invention.

FIG. 3 is a general top view of the first configuration of the wave energy converter of the present invention where most of the components mentioned in the above paragraph can be seen except rotary joint 5 and the gear rack or chain, or equivalent component 4a. Note that float 2, float frame 8, and machine room 1 are inserted in column or beam 4. Float 2, float frame 8 and attached flaps or blades 3a and 3b and corresponding hinges 10a and 10b, can rotate 360 degrees in the horizontal plane while machine room 1 maintains its position in the horizontal plane due to the characteristic of rotary joint 5 (not shown in FIG. 3) of allowing such movements. During normal sea condition where the wave height and wave period do not surpass the design characteristics of the device, the longitudinal axis of float 2 and corresponding float frame 8 is parallel to the wave crest (as shown in FIG. 3), for maximum wave energy exposure and therefore, maximum wave energy extraction by the device.

Figure 4:
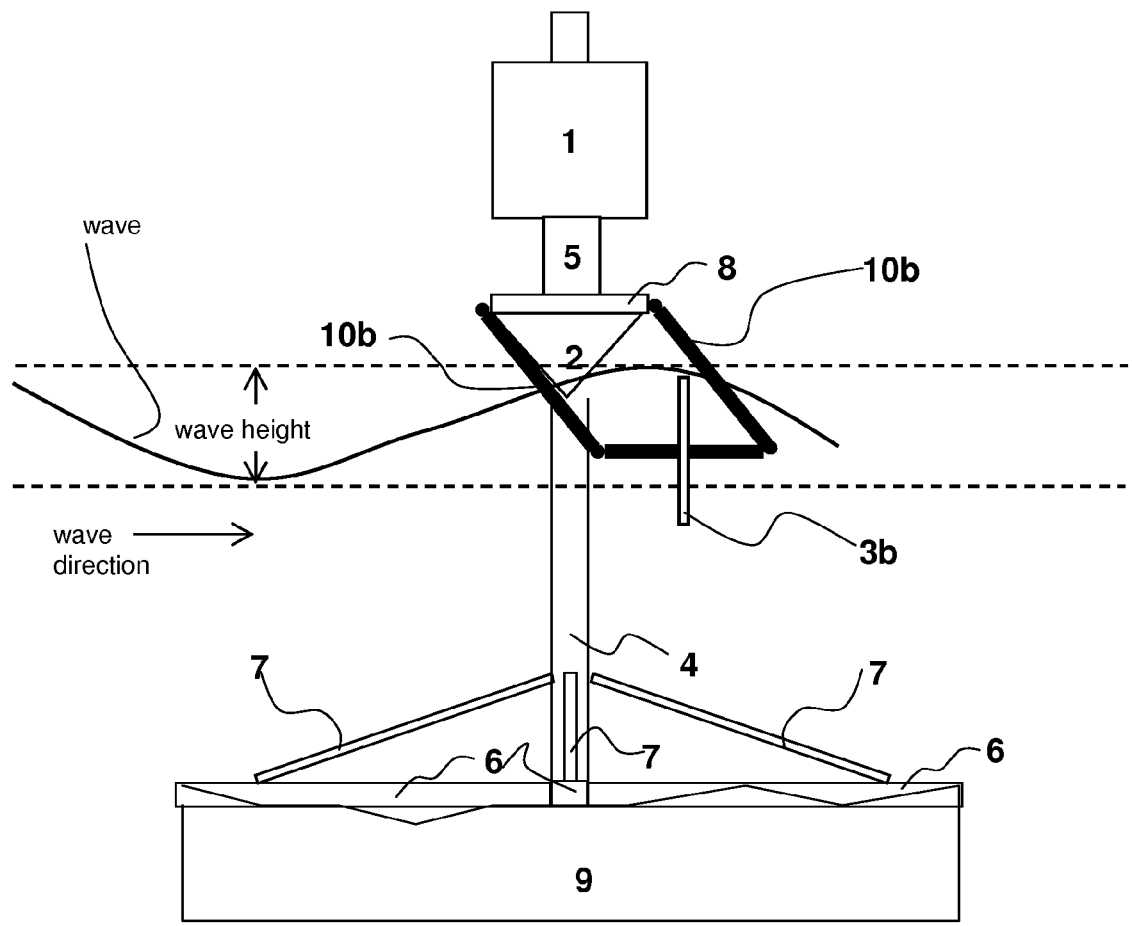
FIG. 4 is a right side view of the first configuration of the wave energy converter of the present invention with flaps or blades pushed backward by the action of a wave.
Figure 5:
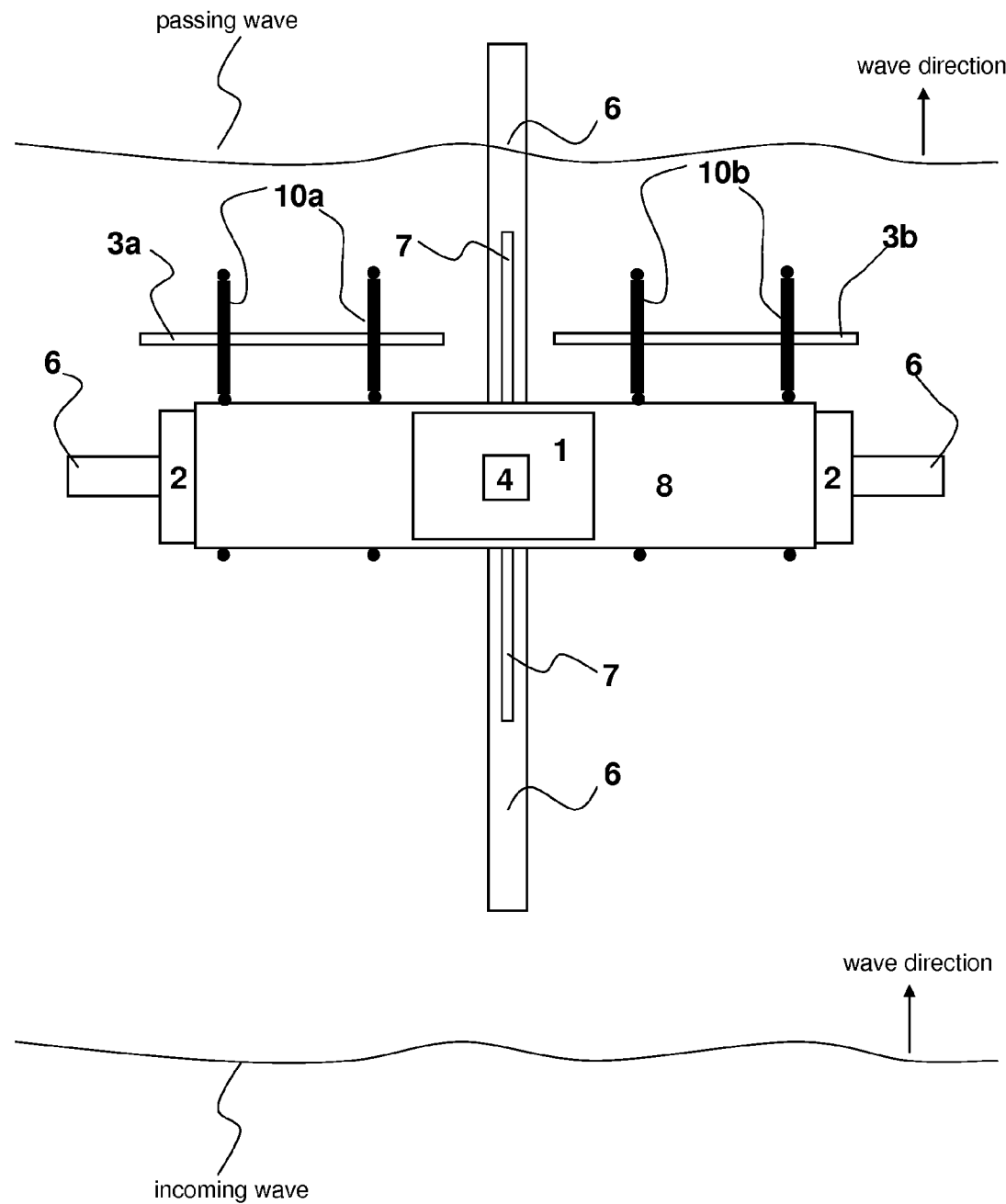
FIG. 5 is a top view of the first configuration of the wave energy converter of the present invention with flaps or blades pushed backward by the action of a wave.

FIG. 4 is a right side view of the first configuration of the wave energy converter of the present invention with flaps or blades 3a and 3b (only 3b shown) pushed backward by the action of an incoming wave. As the incoming wave approaches the device, water molecules moving horizontally towards the device exert pressure perpendicularly to the front area of the flaps or blades 3a and 3b, forcing these flaps or blade to move backward. FIG. 5 is a top view of the first configuration of the wave energy converter of the present invention with flaps or blades pushed backward by the action of a wave.

Figure 6:
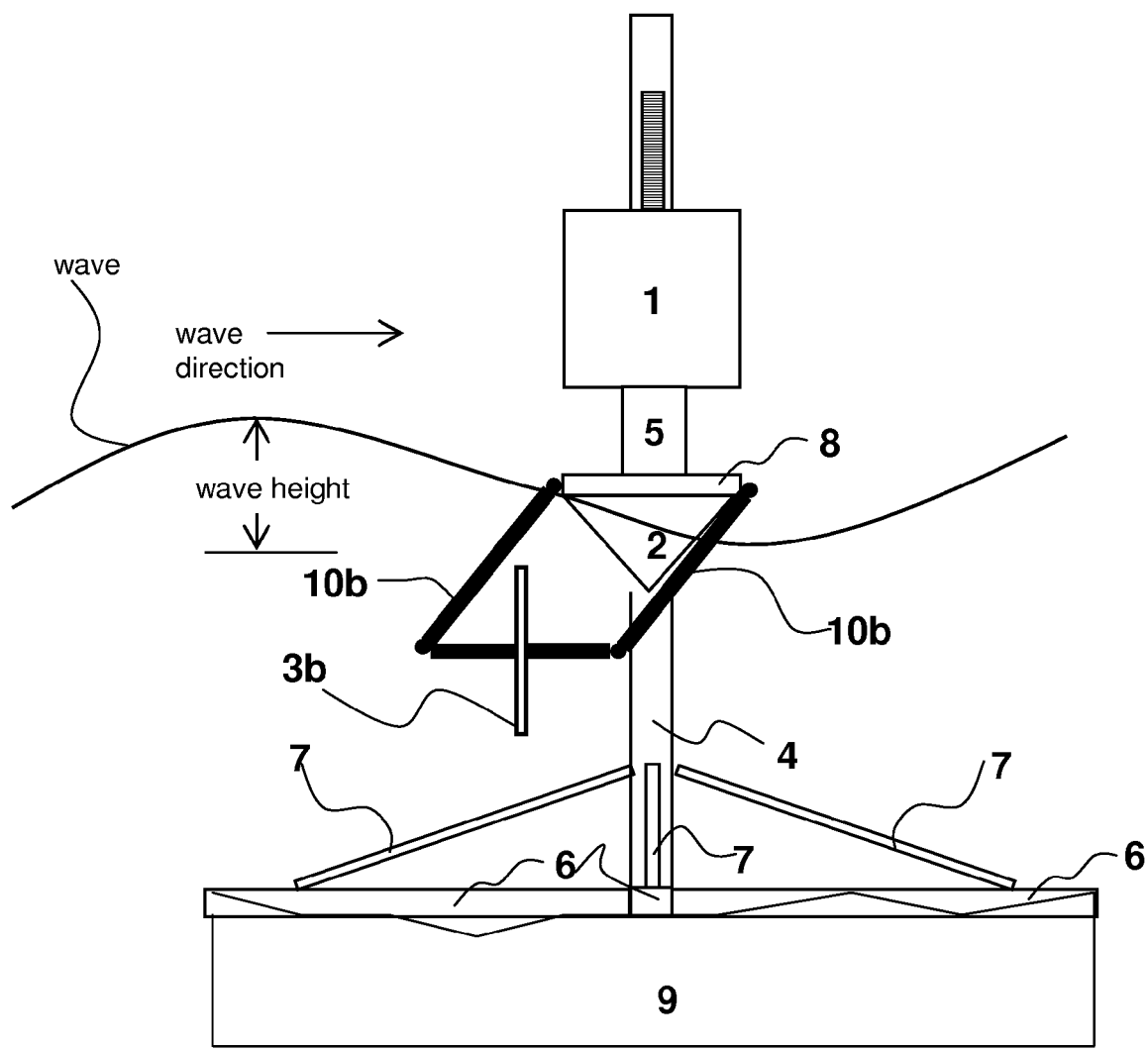
FIG. 6 is a right side view of the first configuration of the wave energy converter of the present invention with flaps or blades pulled forward by the action of a wave.
Figure 7:
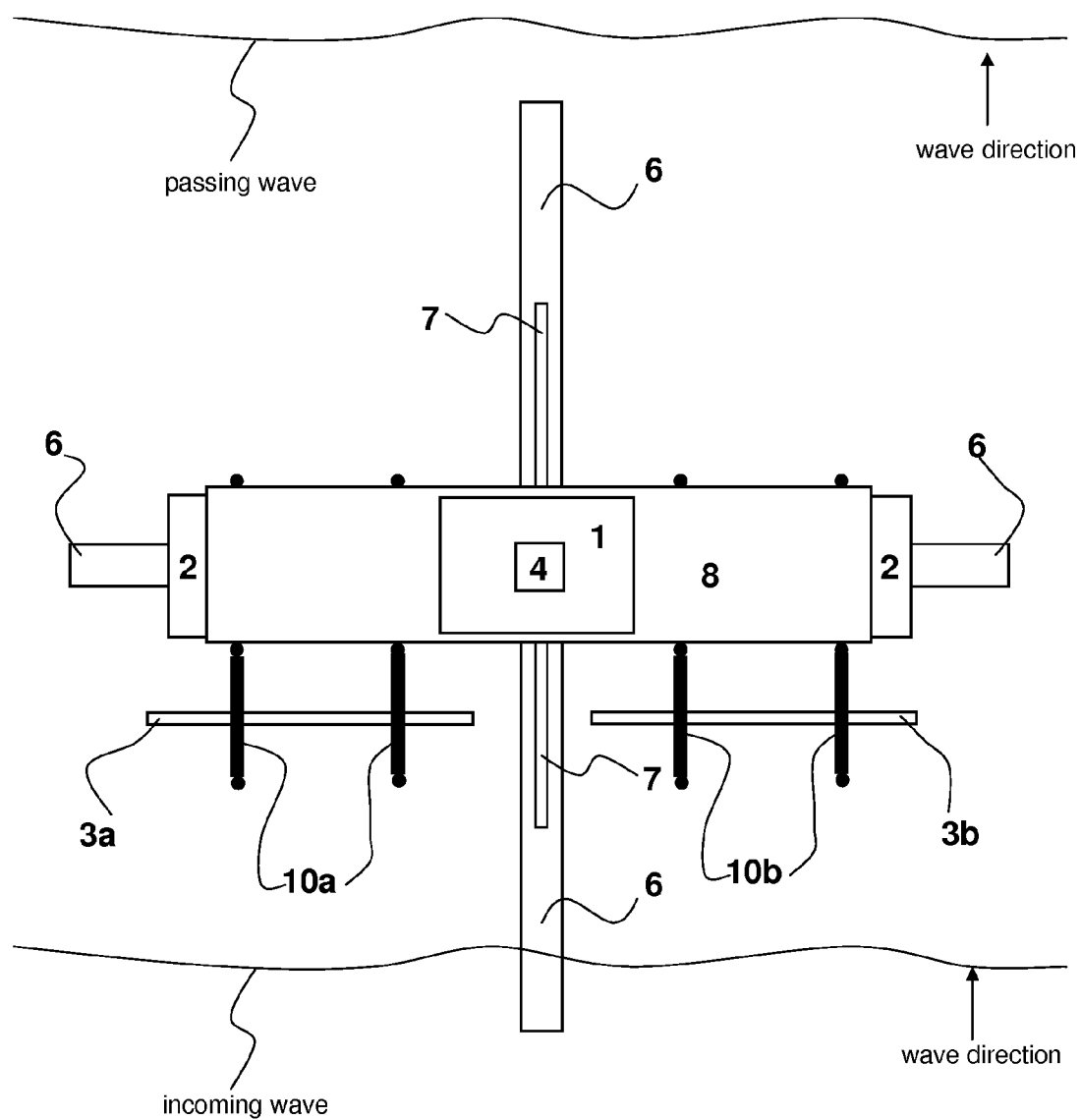
FIG. 7 is a top view of the first configuration of the wave energy converter of the present invention with flaps or blades pulled forward by the action of a wave.

FIG. 6 is a right side view of the first configuration of the wave energy converter of the present invention with flaps or blades 3a and 3b (only 3b shown) pulled forward by the action of a passing wave. As the wave passes, water molecules tend to go back to their original position exerting pressure perpendicularly to the back area of the flaps or blades 3a and 3b, forcing these flaps or blade to move forward. FIG. 7 is a top view of the first configuration of the wave energy converter of the present invention with flaps or blades pulled forward by the action of a wave.

Kinetic energy of the wave is extracted from this back and forth movement of the flaps or blades 3a and 3b through hinges 10a and 10b that transmit this movement through gears to a power take off system for kinetic energy extraction in machine room 1.

Figure 8:
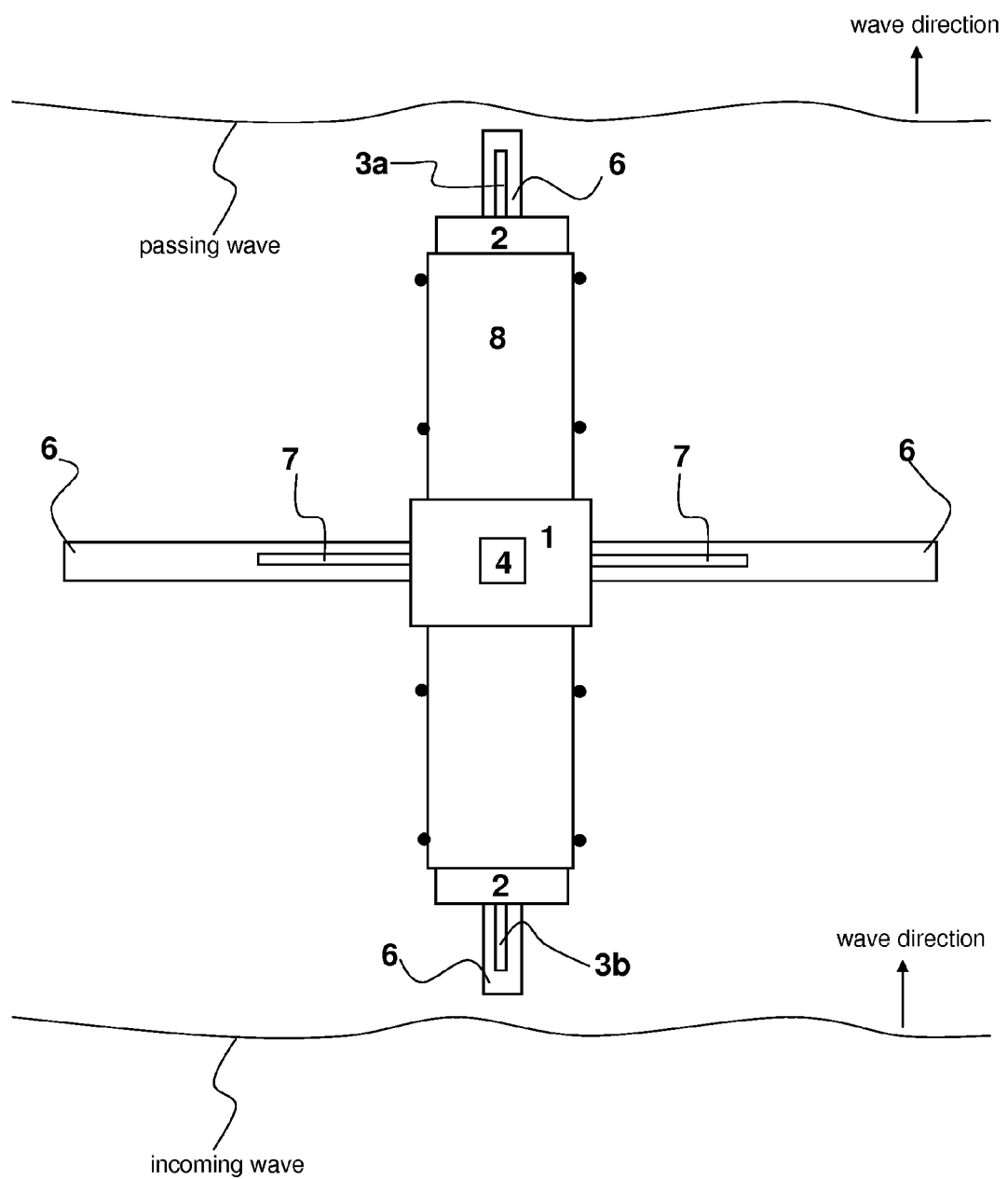
FIG. 8 is a top view of the first configuration of the wave energy converter of the present invention in the survival mode (longitudinal axis of the float structure perpendicular to the wave crest) with flaps or blades unaffected by the action of a wave.

FIG. 8 is a top view of the first configuration of the wave energy converter of the present invention in the survival mode where the longitudinal axis of the float structure is perpendicular to the wave crest (as shown in FIG. 8), for minimum wave energy exposure and therefore, minimum wave energy extraction by the device. Note that machine room 1 maintains its original position with respect to the wave crest (i.e., its longitudinal axis is parallel to the wave crest) because rotary joint 5 (not shown) only allows rotation of float 2, its base 8 and the flaps or blades 3a and 3b hanging from float frame 8.

Figure 9:
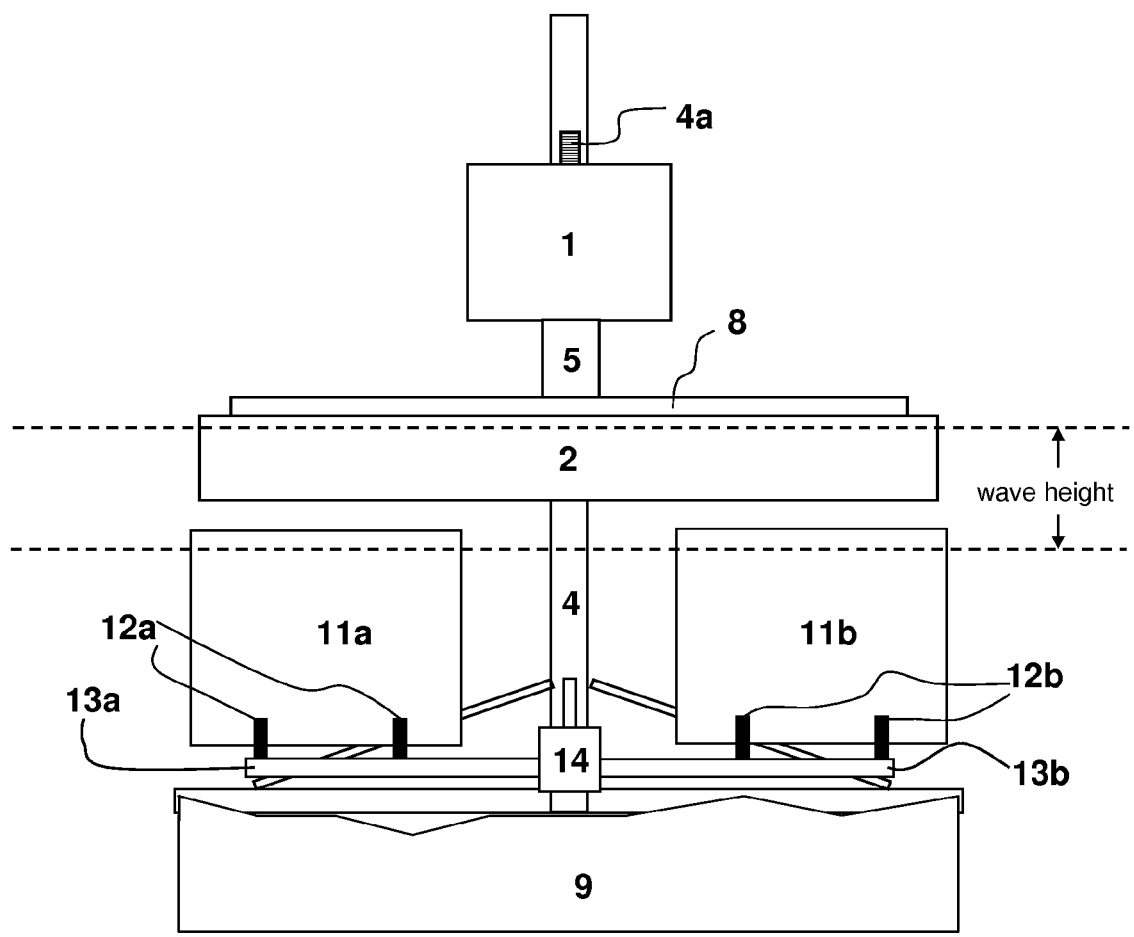
FIG. 9 is a general front view of the second configuration (flaps or blades attached to the front leg of the main column or beam) of the wave energy converter of the present invention.
Figure 10:
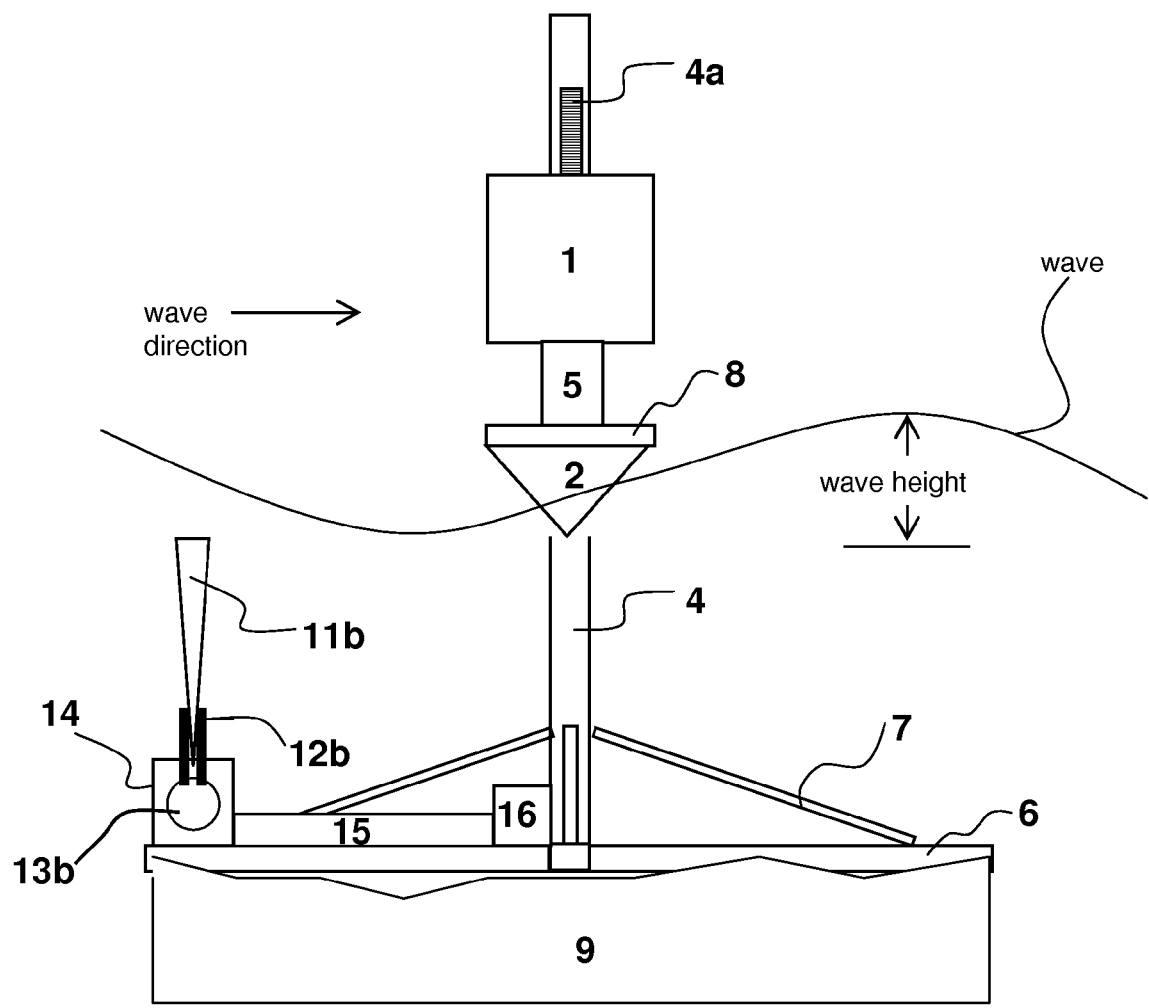
FIG. 10 is a general right side view of the second configuration (flaps or blades attached to the front leg of the main column or beam) of the wave energy converter of the present invention.

FIG. 9 is a general front view of the second configuration (flaps or blades attached to the front leg 6 of the main column or beam 4) of the wave energy converter of the present invention and FIG. 10 is a general right side view of the second configuration (flaps or blades attached to the front leg 6 of the main column or beam 4) of the wave energy converter of the present invention. Note the movement and direction of the waves as illustrated in FIG. 10. Referring to FIGS. 9 and 10, the apparatus is composed of a machine room 1 which encloses a power take off system (not shown). Machine room 1 is built in such a manner as to maintain water out in any sea condition. Below machine room 1 separated by rotary joint 5 that allows rotational movement of components below, there is a float 2 that serves two purposes. One purpose is to keep machine room 1 always above the water line for avoiding flooding of water leakage. The other purpose is to serve as the component for extracting potential energy from waves.

When an incoming wave interacts with float 2, float 2 starts to rise being pushed by the floating force generated by the water it displaces. The upward movement of float 2 moves machine room 1 upwardly the same distance. When a wave passes float 2, float 2 starts to fall being pulled by the gravity force generated by the weights of float 2 and all structures above water. This downward movement of float 2 moves machine room 1 downward the same distance. The power take off (PTO) system within machine room 1 (not shown) converts the up and down random movement of waves to high speed rotational movement that may end up, in the case of electric power generation, moving a series of generators (not shown). Also seen in FIG. 9 are the left flap or blade 11a attached to a left shaft 13a by hinges 12a and flap or blade 11b attached to a left shaft 13b by hinges 12b for kinetic energy extraction mounted on the Front Leg of the main column or blade. Both left and right shafts 13a and 13b transmit the back and forth movement of flaps or blades 11a and 11b to gearbox 14. Gearbox 14 transmits the movement originated by the flaps 11a and 11b to gearbox 16 at the base of the main column or beam through transmission shaft 15. Gearbox 16 transmits the movement to machine room 1 for power conversion. FIG. 10 shows a side view of the second configuration of the device only showing hinges 12b supporting flap or blade 11b, among other components. Also shown in FIGS. 9 and 10 is the main column or beam 4 of the device that is attached to legs 6 and corresponding supports 7 for placing the device at the sea or lake bottom 9. In these Figures is also shown Rotary joint 5 that separates machine room 1 from float frame 8 and that is design to allow the float and its corresponding base to rotate in any horizontal direction while maintaining the machine room fixed in the same horizontal direction. Finally, FIGS. 9 and 10 show a gear rack or chain, or equivalent component 4a that, in this second configuration, acts as a moving member of the device, moving up and down with passing waves, as will be explained later. The PTO system extracts energy through its pinions that while moving up and down due to the incoming and passing waves, interact with the gear rack or chain, or equivalent component 4a that moves up and down in the main column or beam always in the opposite direction of machine room 1, as will be described later.

Figure 11:
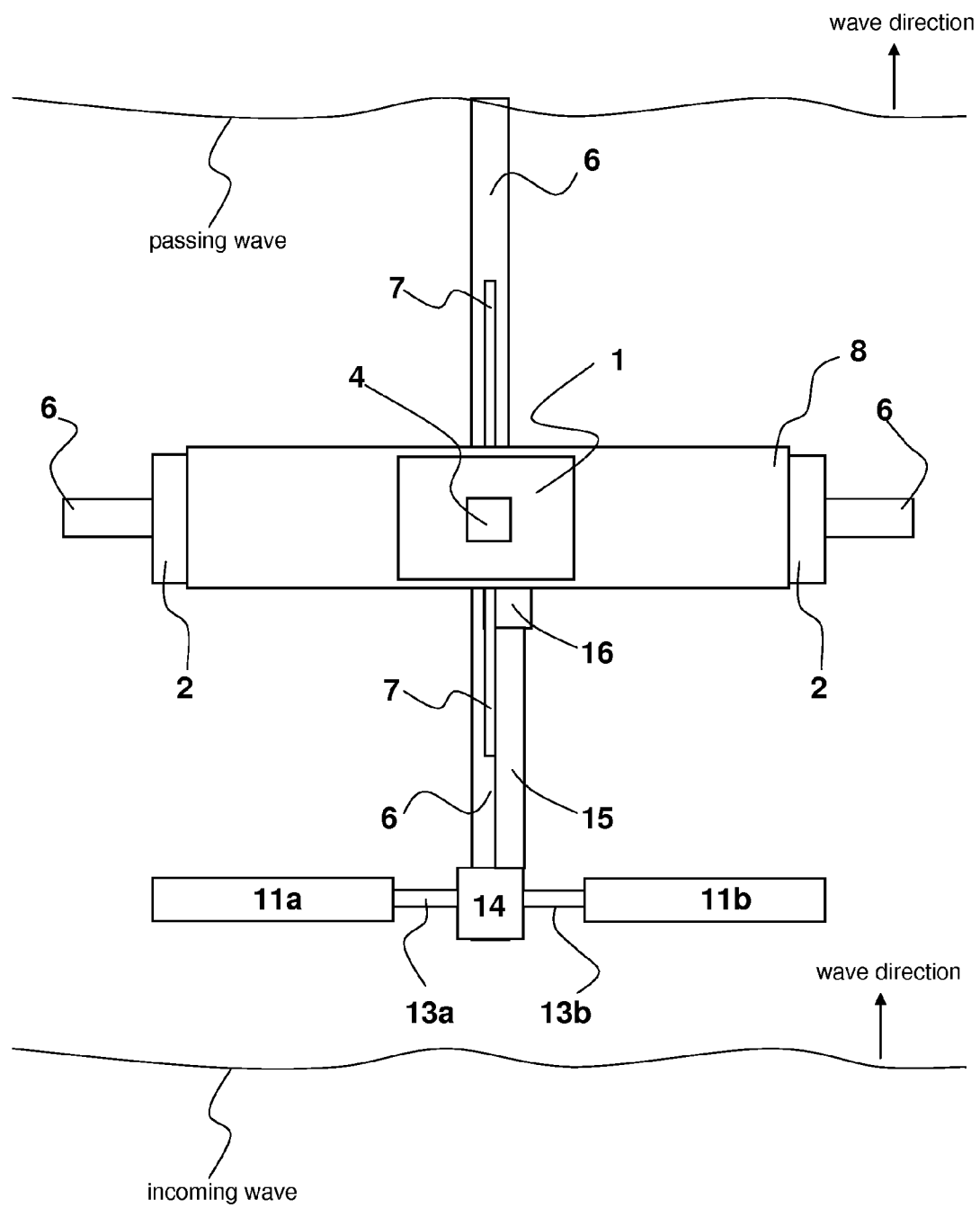
FIG. 11 is a general top view of the second configuration (flaps or blades attached to the front leg of the main column or beam) of the wave energy converter of the present invention.

FIG. 11 is a general top view of the second configuration (flaps or blades attached to the front leg of the main column or beam) of the wave energy converter of the present invention where most of the components mentioned in the above paragraph can be seen except rotary joint 5 and the gear rack or chain, or equivalent component 4a. Note that float 2, float frame 8, and machine room 1 are inserted in column or beam 4. Float 2, and float frame 8 can rotate 360 degrees in the horizontal plane while machine room 1 maintains its position in the horizontal plane due to the characteristic of rotary joint 5 (not shown in FIG. 11) of allowing such movements. During normal sea condition where the wave height and wave period do not surpass the design characteristics of the device, the longitudinal axis of float 2 and corresponding base 8 is parallel to the wave crest (as shown in FIG. 11), for maximum wave energy exposure and therefore, maximum wave energy extraction by the device.

Figure 12:
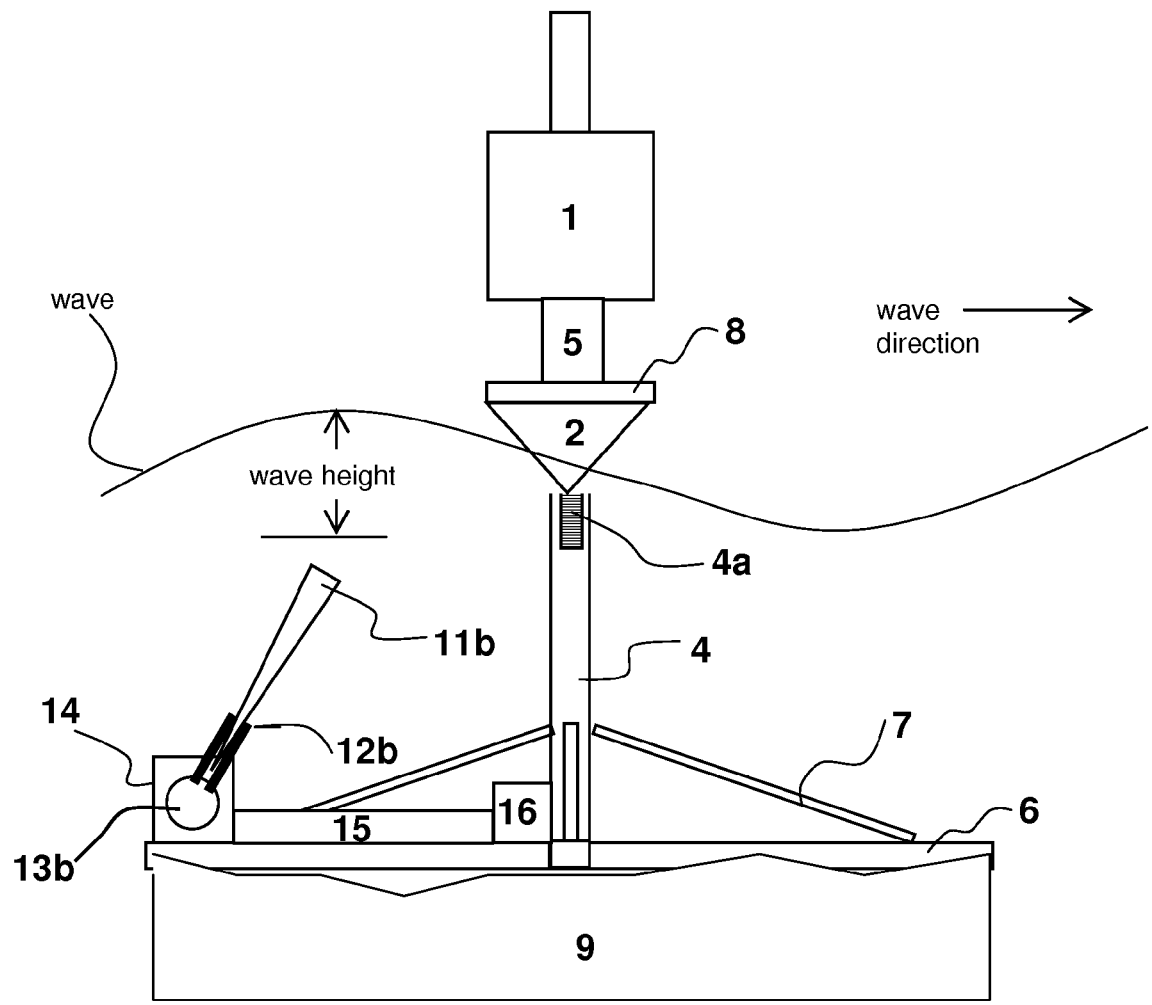
FIG. 12 is a right side view of the second configuration of the wave energy converter of the present invention with flaps or blades pushed backward by the action of a wave.
Figure 13:
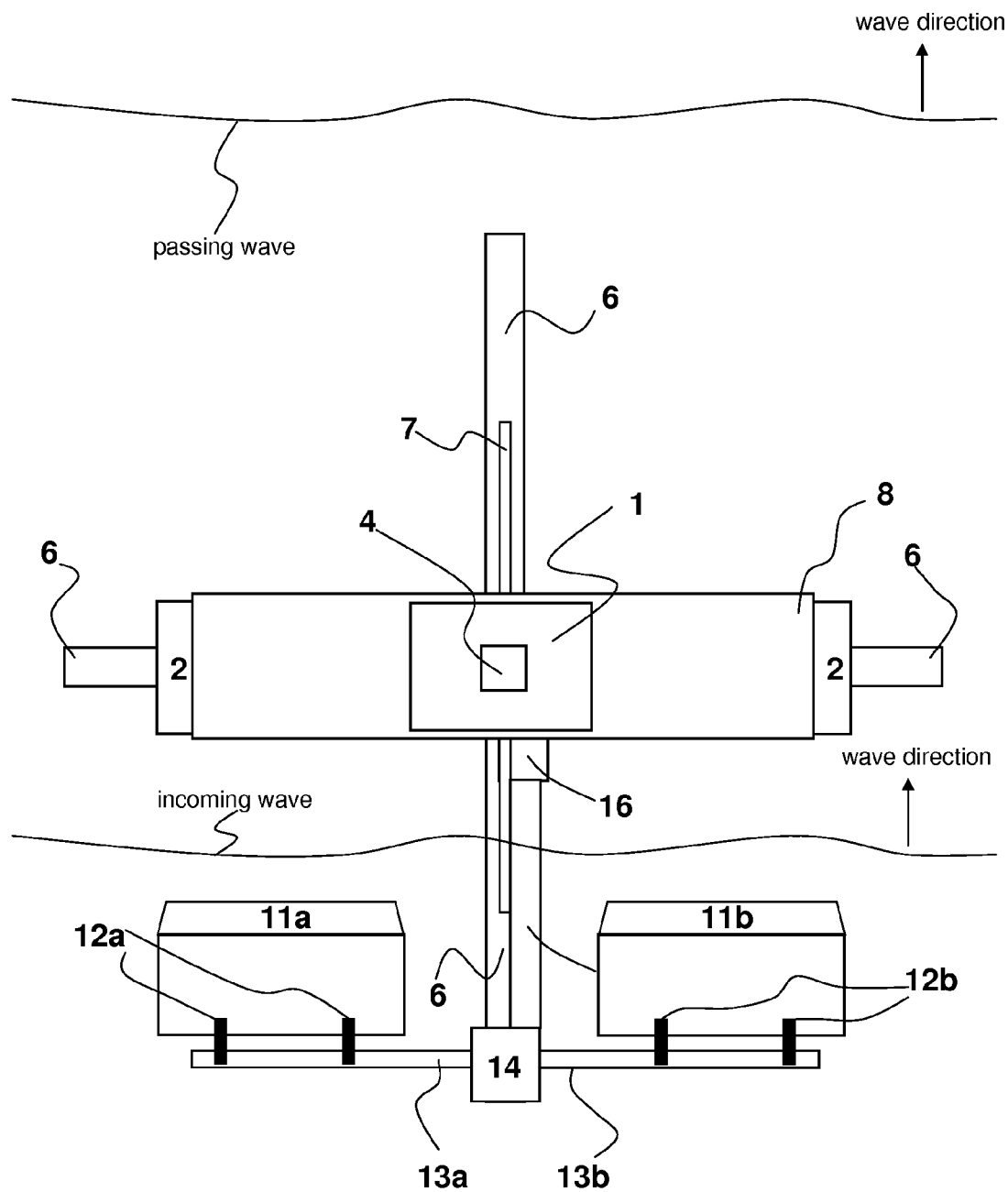
FIG. 13 is a top view of the second configuration of the wave energy converter of the present invention with flaps or blades pushed backward by the action of a wave.

FIG. 12 is a right side view of the second configuration of the wave energy converter of the present invention with flaps or blades 11a and 11b (only 11b shown) pushed backward by the action of an incoming wave. As the incoming wave approaches the device, water molecules moving horizontally towards the device exert pressure perpendicularly to the front area of the flaps or blades 11a and 11b, forcing these flaps or blade to move backward. FIG. 13 is a top view of the second configuration of the wave energy converter of the present invention with flaps or blades pushed backward by the action of a wave.

Figure 14:
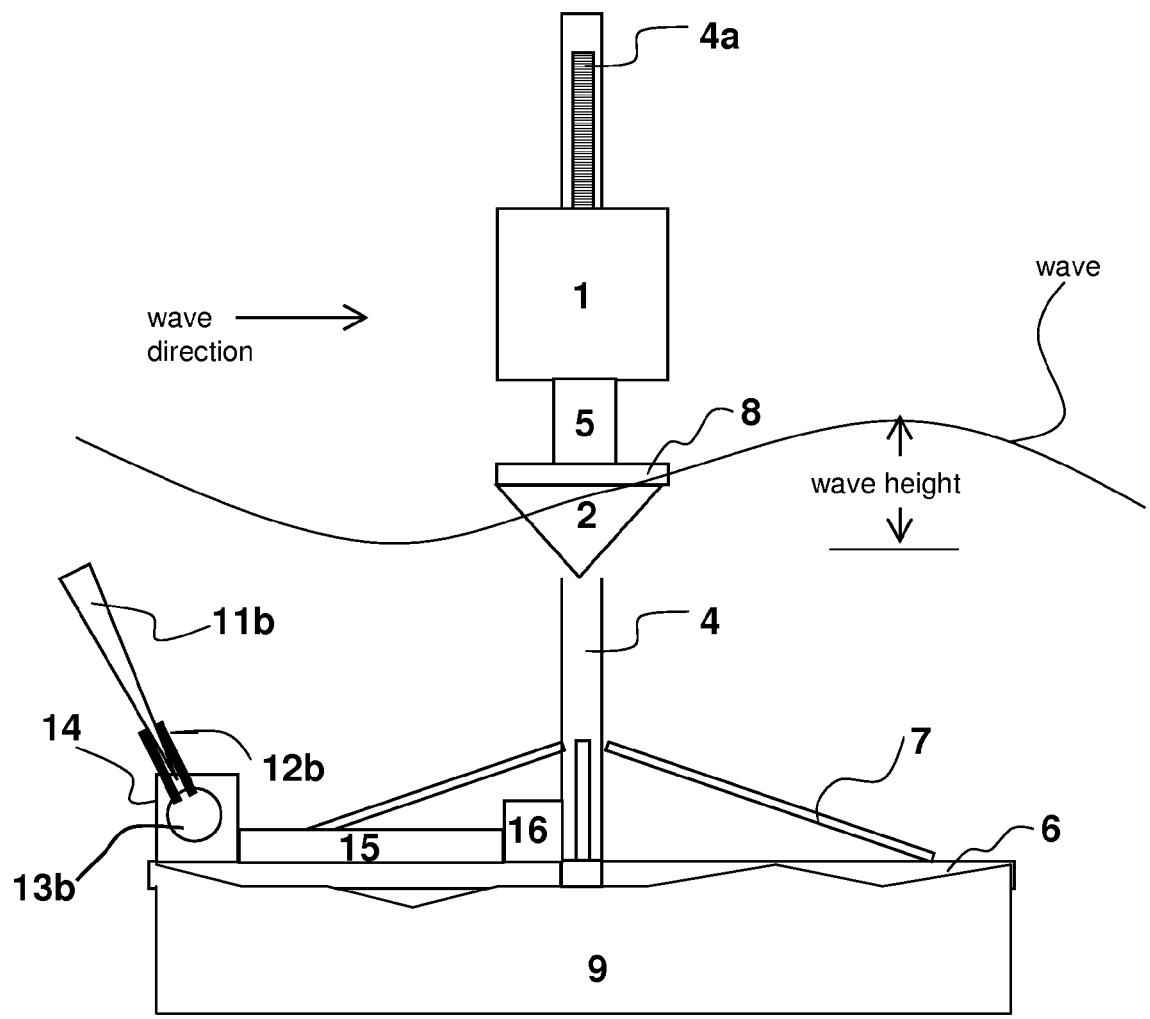
FIG. 14 is a right side view of the second configuration of the wave energy converter of the present invention with flaps or blades pulled forward by the action of a wave.
Figure 15:
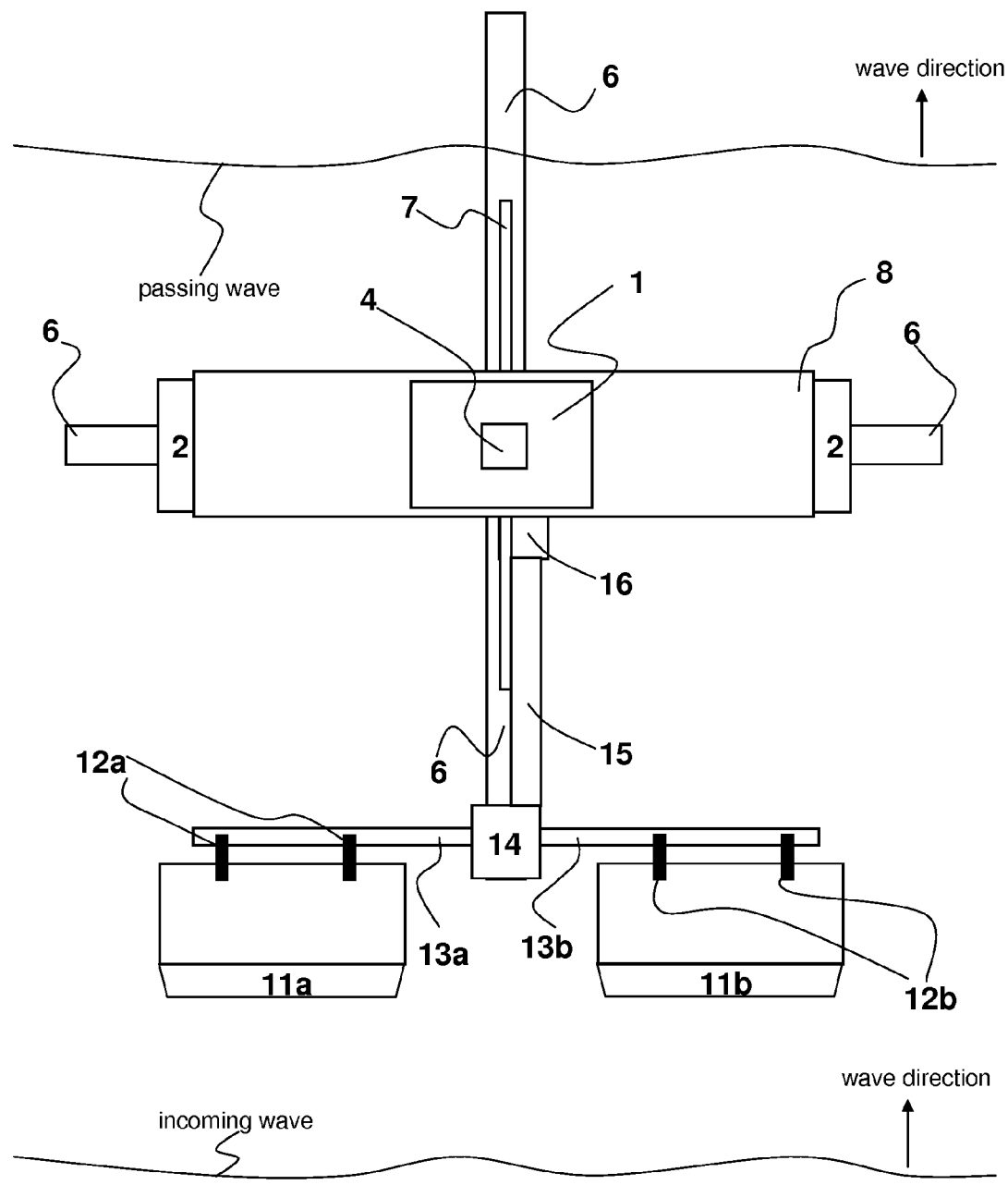
FIG. 15 is a top view of the second configuration of the wave energy converter of the present invention with flaps or blades pulled forward by the action of a wave.

FIG. 14 is a right side view of the second configuration of the wave energy converter of the present invention with flaps or blades 11a and 11b (only 11b shown) pulled forward by the action of a passing wave. As the wave passes, water molecules tend to go back to their original position exerting pressure perpendicularly to the back area of the flaps or blades 11a and 11b, forcing these flaps or blade to move forward. FIG. 15 is a top view of the second configuration of the wave energy converter of the present invention with flaps or blades pulled forward by the action of a wave.

Kinetic energy of the wave is extracted from this back and forth movement of the flaps or blades 11a and 11b through the shafts 13a and 13b where flaps are attached with hinges 12a and 12b. Both left and right shafts 13a and 13b transmit the back and forth movement of the flaps or blades to a gearbox 14. This gearbox transmits this movement to a gearbox 16 at the base of the main column or beam through transmission shaft 15. Gearbox 16 transmits the movement to machine room 1 for power conversion.

Figure 16:
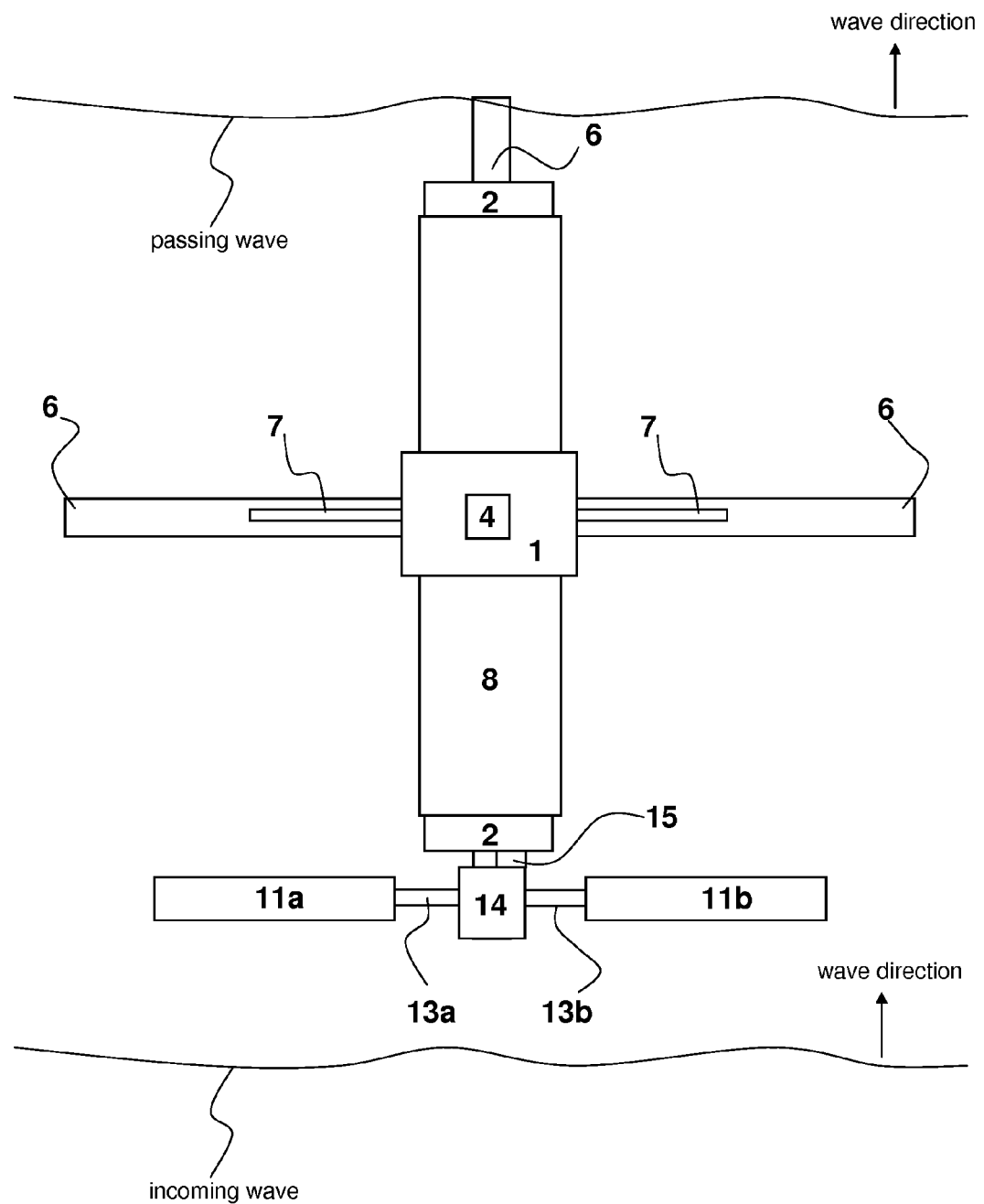
FIG. 16 is a top view of the second configuration of the wave energy converter of the present invention in a first survival mode (longitudinal axis of the float structure perpendicular to the wave crest) with flaps or blades in a position parallel with respect to the wave crest.
Figure 17:
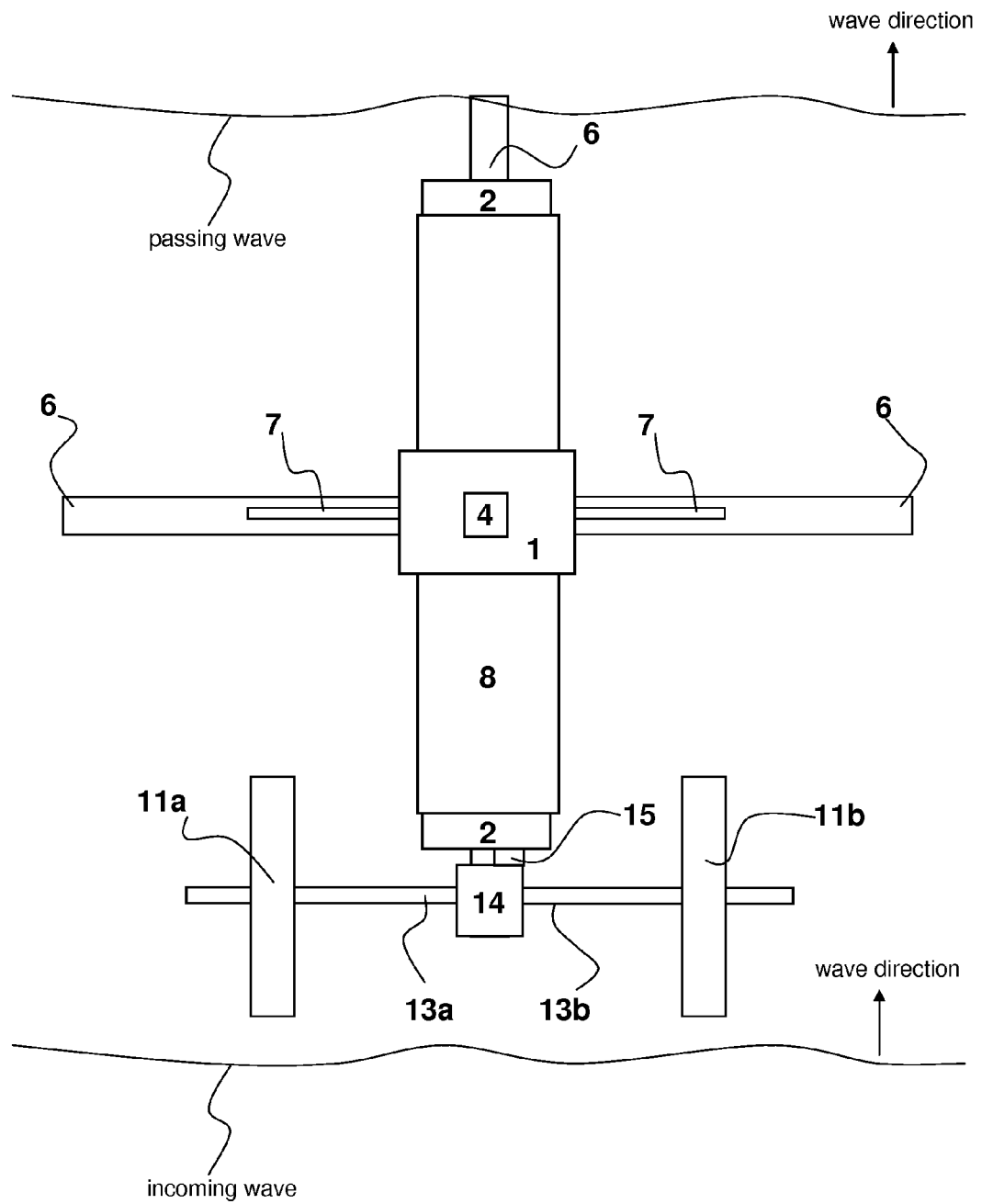
FIG. 17 is a top view of the second configuration of the wave energy converter of the present invention in a second survival mode (longitudinal axis of the float structure perpendicular to the wave crest) with flaps or blades in a position perpendicular with respect to the wave crest.

FIG. 16 is a top view of the second configuration of the wave energy converter of the present invention in a first survival mode where the longitudinal axis of the float structure is perpendicular to the wave crest (as shown in FIG. 16), for minimum wave energy exposure and therefore, minimum wave energy extraction by the device. Note that machine room 1 maintains its original position with respect to the wave crest (i.e., its longitudinal axis is parallel to the wave crest) because rotary joint 5 (not shown) only allows rotation of float 2, and its base 8. Note that here in the first survival mode of the second configuration of the device, the flaps or blades 11a and 11b attached to the front leg 6 of the main column or beam maintain themselves in a parallel position with respect to the wave crest, therefore maintaining a maximum energy extraction position. A second survival mode of the second configuration is shown in FIG. 17, where with a modified design for hinges 12a and 12b, flaps 11a and 11b can rotate to a position perpendicular with respect to the wave crest, therefore achieving a minimum energy extraction position.

Figure 18:
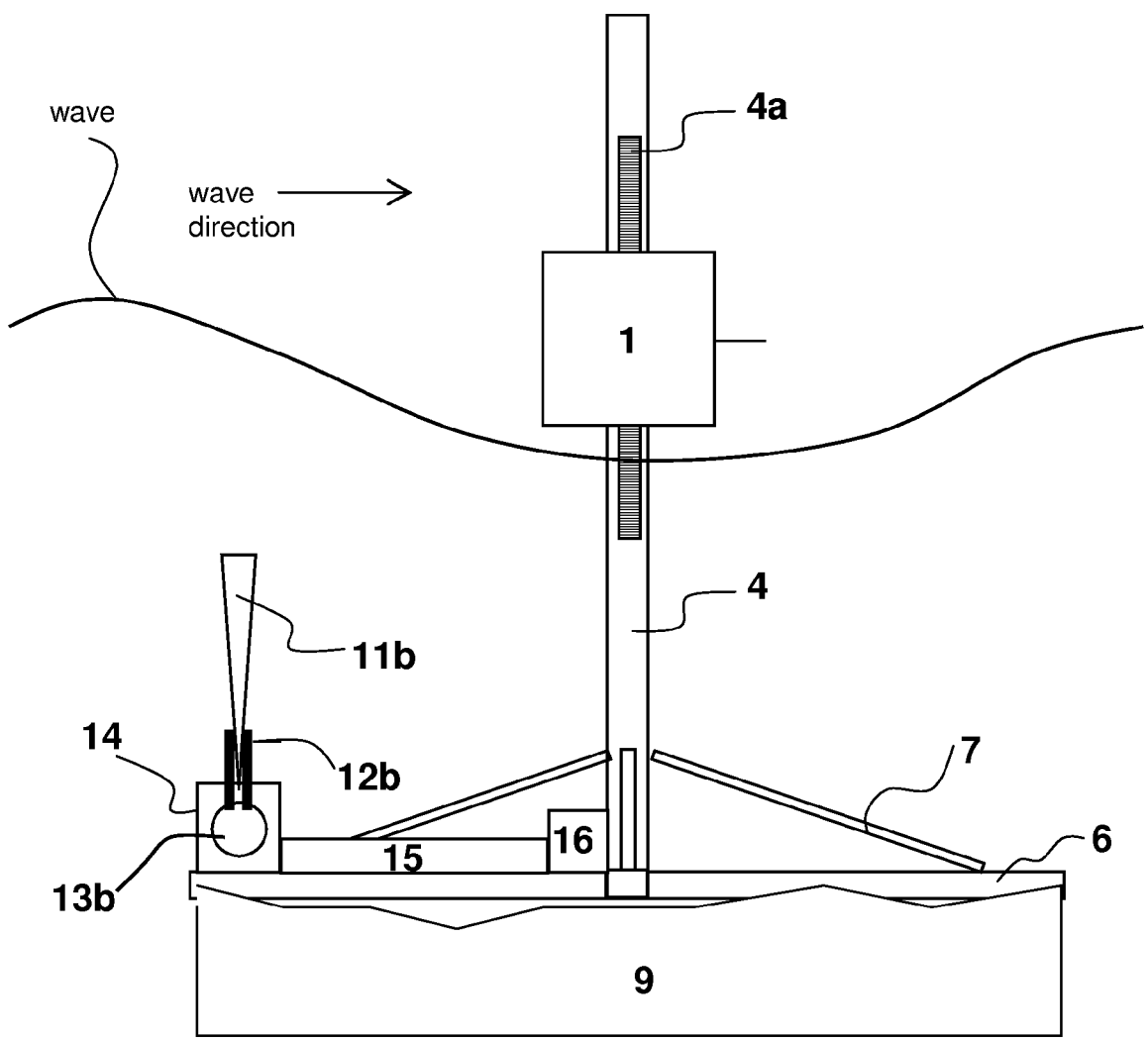
FIG. 18 is a right side view of the second configuration of the wave energy converter of the present invention with flaps or blades in the middle position indicating the machine room (float and corresponding base and rotary joint supporting the machine room not shown) in the mid position and the gear rack, for power extraction through power take off systems pinions, in the middle position as well.
Figure 19:
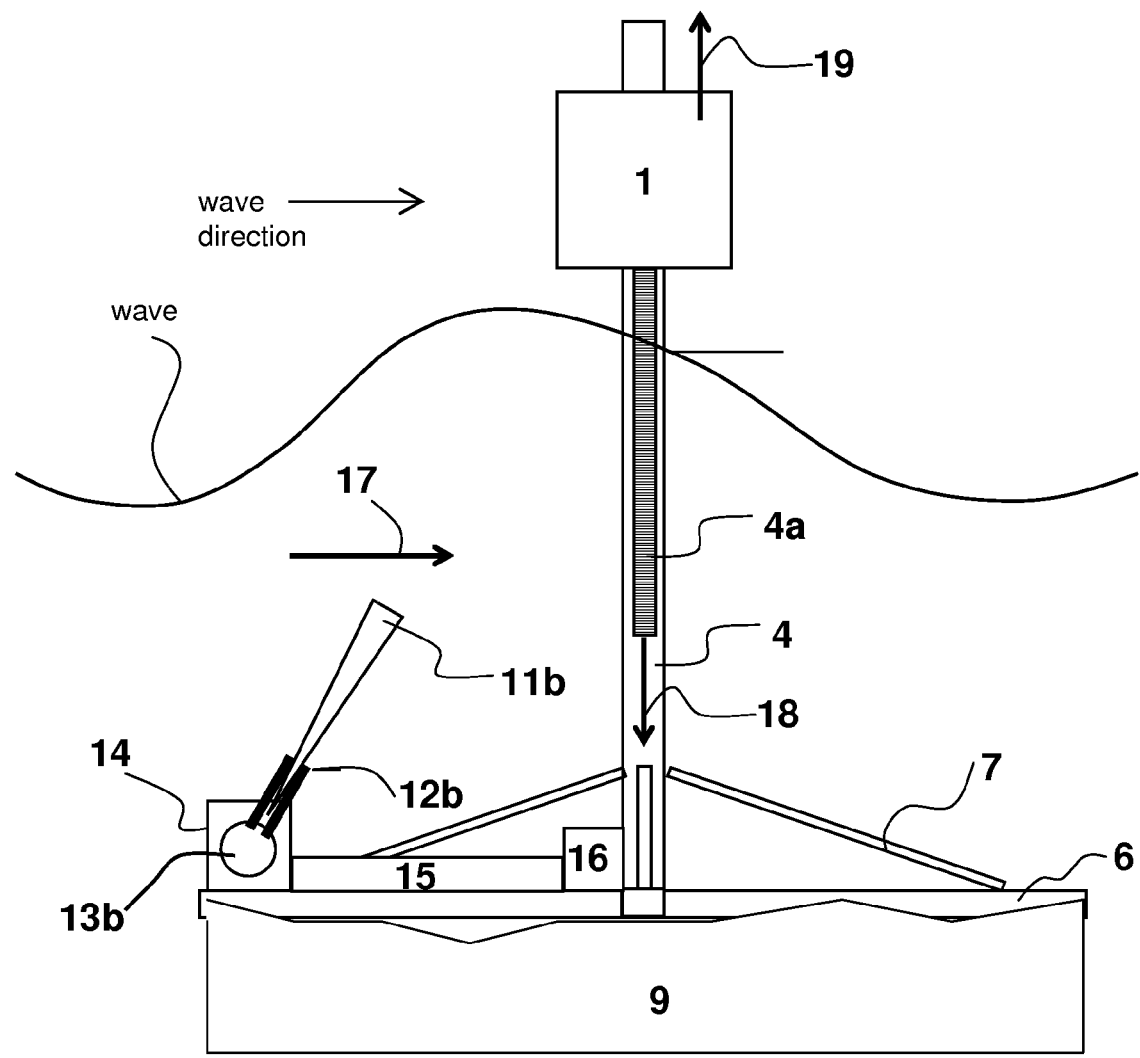
FIG. 19 is a right side view of the second configuration of the wave energy converter of the present invention with flaps or blades in the pushed backward position indicating the machine room (float and corresponding base and rotary joint supporting the machine room not shown) in the upper position and the gear rack, for power extraction through power take off systems pinions, in a lower position.

FIG. 18 is a right side view of the second configuration of the wave energy converter of the present invention with flaps or blades 11a and 11b (only flap 11b shown in FIG. 18) in the middle position indicating machine room 1 in the mid position and the gear rack or chain, or equivalent component 4a for power extraction through power take off systems pinions, in middle position too (float 2 and corresponding float frame 8 and rotary joint 5 supporting the machine room not shown). There is a synchronized movement between the flaps 11a and 11b and the gear rack or chain, or equivalent component 4a though components 13a, 13b, 14, 15 and 16. As can be seen in FIG. 19, as the flaps 11a and 11b move backward as indicated with arrow 17, pushed by the action of an incoming wave, the gear rack or chain, or equivalent component 4a moves downward as indicated by arrow 18. It is expected that at the same time, due to the buoyancy force exerted in float 2 (not shown), machine room 1 will move upward as indicated by arrow 19.

Figure 20:
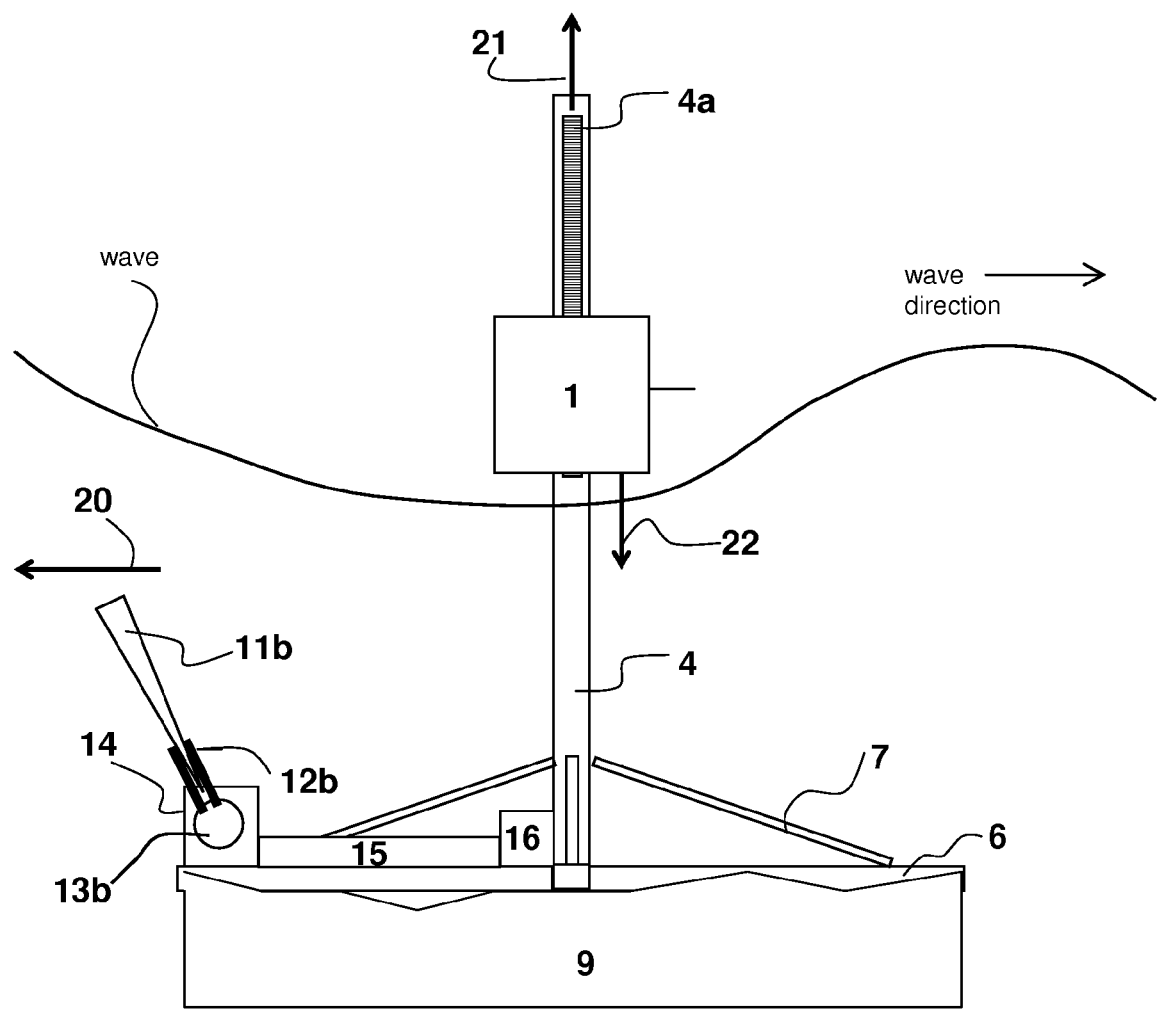
FIG. 20 is a right side view of the second configuration of the wave energy converter of the present invention with flaps or blades in the pulled forward position indicating the machine room (float and corresponding base and rotary joint supporting the machine room not shown) in the lower position and the gear rack, for power extraction through power take off systems pinions, in an upper position.

Also, as can be seen in FIG. 20, as the flaps 11a and 11b move forward as indicated with arrow 20, pulled by the action of a passing wave, the gear rack or chain, or equivalent component 4a moves upward as indicated by arrow 21. It is expected that at the same time, due to the force exerted on float 2 (not shown) by gravity, machine room 1 will move downward as indicated by arrow 22. This synchronize movement of components 11a and 11b, 4a and 1 will result in a longer run of the pinions of the power take off system (not shown) over the gear rack or chain, or equivalent component 4a, transmitting then simultaneously both vertical and horizontal movements of water molecules derived from both the potential energy and the kinetic energy of the waves to the pinions of the power take off system.

Figure 21:
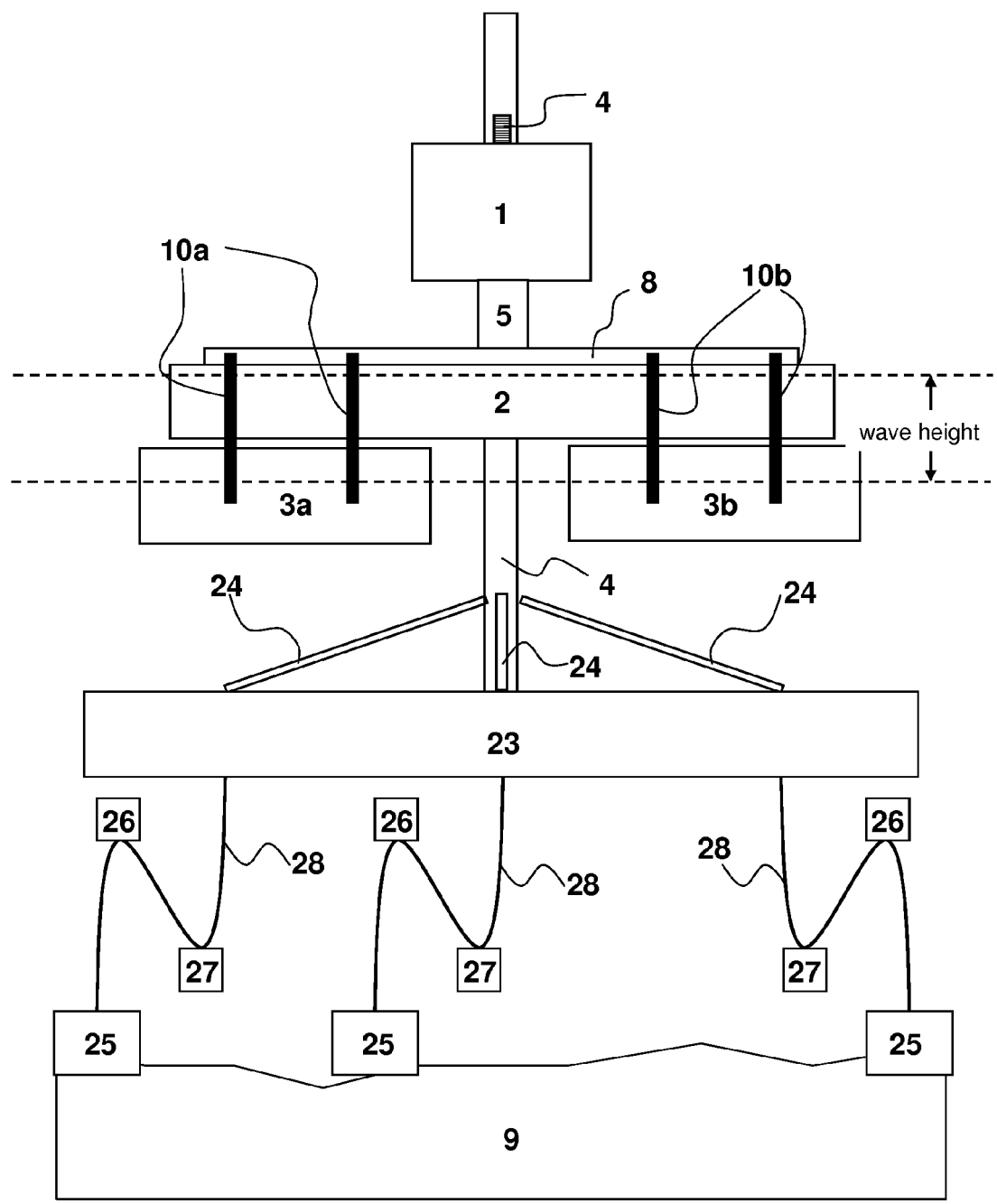
FIG. 21 is a front view of the first configuration of the wave energy converter of the present invention where the main column or beam is attached to an underwater float for deep-water deployment.

For deep water deployment, FIG. 21 is a front view of the first configuration of the wave energy converter of the present invention where the main column or beam 4 is attached to an underwater floating base 23 supported by support bars 24. The underwater floating base 23 could be anchored in a lax manner utilizing cable 28, anchor 25, float 26 and weight 27. The underwater floating base 23 could be anchored in a tight manner (not shown).

Figure 22:
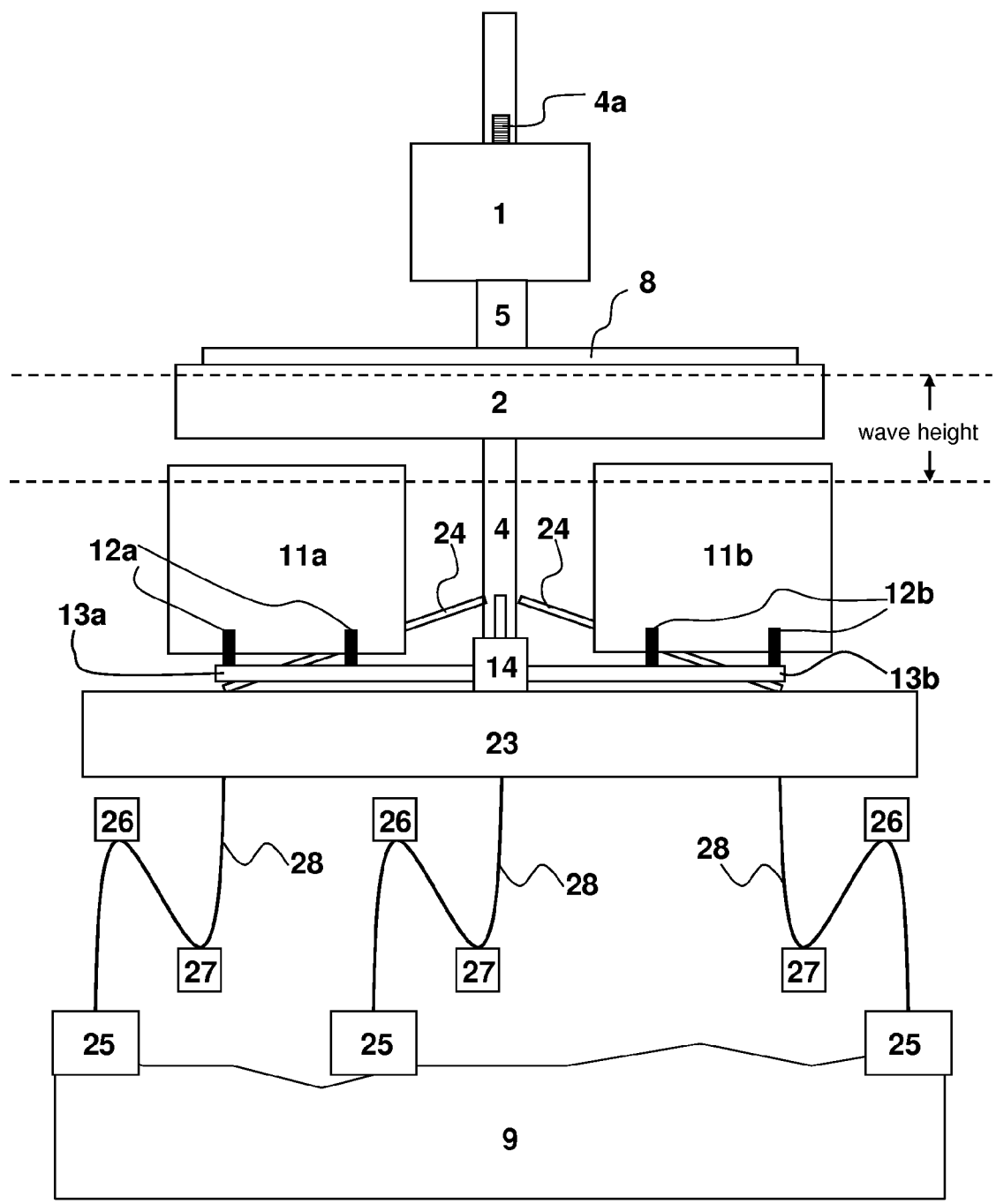
FIG. 22 is a front view of the second configuration of the wave energy converter of the present invention where the main column or beam is attached to an underwater float for deep-water deployment.

For deep water deployment, FIG. 22 is a front view of the second configuration of the wave energy converter of the present invention where the main column or beam 4 is attached to an underwater floating base 23 supported by support bars 24. The underwater floating base 23 could be anchored in a lax manner utilizing cable 28, anchor 25, float 26 and weight 27. The underwater floating base 23 could be anchored in a tight manner (not shown).

While the preferred embodiment and various alternative embodiments of the invention have been disclosed and described in detail herein, it may be apparent to those skilled in the art that various changes in form and detail may be made therein without departing from the spirit and scope thereof.

We claim:

1. A wave energy conversion system comprising:
   a float floating on a surface of a body of water having wave action, the float moving with the wave action of the body of water;
   a base, secured to resist movement from the wave action of the body of water;
   a column, attached to the base and protruding from the surface of the body of water; and
   a machine room, attached to the float above the surface of the body of water so as to remain out of the body of water, the machine room including a power take-off for converting linear motion of the float into rotary motion,
   wherein the machine room is separated from the float through a rotary joint allowing the float to rotate in any horizontal direction while maintaining the machine room fixed in the same horizontal direction.

2. The wave energy conversion system of claim 1, further comprising:
   a rack, coupled to the column, and
   a pinion, coupled to the machine room, wherein when the float moves up and down in response to wave action of the body of water, the pinion rotates on the rack, converting linear motion of the float to rotary motion of the pinion.

3. The wave energy conversion system of claim 1, further comprising:
   a chain, coupled to the column, and
   a gear, coupled to the machine room, wherein when the float moves up and down in response to wave action of the body of water, the chain rotates the gear, converting linear motion of the float to rotary motion of the gear.

4. The wave energy conversion system of claim 1, wherein the column is supported by legs and corresponding leg supports on a bottom of the body of water.

5. The wave energy conversion system of claim 1, wherein the column is supported by column supports attached to an underwater float.

6. The wave energy system of claim 5, wherein the underwater float is attached to a bottom of the body of water through beams.

7. The wave energy system of claim 5, wherein the underwater float is attached to a bottom of the body of water through lax anchoring.

8. The wave energy system of claim 5, wherein the underwater float is attached to a bottom of the body of water through tight anchoring.

9. The wave energy system of claim 1, wherein the rotary joint separating the float frame and the machine room also allows for vertical up and down movement when interacting with incoming waves while maintaining a constant distance between the machine room and the float frame.

10. The wave energy system of claim 7, wherein in normal sea conditions and in order to maintain the float oriented in a manner to absorb a greatest amount of energy per wave crest where a longitudinal axis of the float is parallel to a wave crest, the float and base are lax anchored parallel to a predominant wave crest line.

11. A wave energy conversion system, comprising:
   a float floating on a surface of a body of water having wave action the float moving with the wave action of the body of water;
   a base, secured to resist movement from the wave action of the body of water;
   a column, attached to the base and protruding from the surface of the body of water; and
   a machine room, attached to the float above the surface of the body of water so as to remain out of the body of water, the machine room including a power take-off for converting linear motion of the float into rotary motion
   wherein in normal sea conditions and in order to maintain the float oriented in a manner to absorb a greatest amount of energy per wave crest where a longitudinal axis of the float is parallel to a wave crest, the float has a system of fins which interact with incoming waves to maintain a desired orientation.

12. A wave energy conversion system, comprising:
   a float floating on a surface of a body of water having wave action, the float moving with the wave action of the body of water;
   a base, secured to resist movement from the wave action of the body of water;
   a column, attached to the base and protruding from the surface of the body of water; and
   a machine room, attached to the float above the surface of the body of water so as to remain out of the body of water, the machine room including a power take-off for converting linear motion of the float into rotary motion
   wherein in normal sea conditions and in order to maintain the float oriented in a manner to absorb a greatest amount of energy per wave crest where a longitudinal axis of the float is parallel to a wave crest, the float and base are lax anchored parallel to a predominant wave crest line, and
   wherein during abnormal sea conditions when the rotational speed of the power take off surpasses a desired set speed and design capacity of the wave energy system is being surpassed, the fins may take a position to maintain the longitudinal axis of the float frame perpendicular to incoming waves, thus allowing the wave energy system to absorb a minimum amount of energy per wave crest.

13. A wave energy conversion system, comprising:
   a float floating on a surface of a body of water having wave action the float moving with the wave action of the body of water;
   a base, secured to resist movement from the wave action of the body of water;
   a column, attached to the base and protruding from the surface of the body of water; and
   a machine room, attached to the float above the surface of the body of water so as to remain out of the body of water, the machine room including a power take-off for converting linear motion of the float into rotary motion,
   wherein in normal sea conditions and in order to maintain the float oriented in a manner to absorb a greatest amount of energy per wave crest where a longitudinal axis of the float is parallel to a wave crest, the float and base are lax anchored parallel to a predominant wave crest line, and
   wherein during abnormal sea conditions when the rotational speed of the power take off surpasses a desired set speed and design capacity of the wave energy system is being surpassed, the float and base may lax anchored perpendicular to the predominant wave crest line to allow the wave energy system to absorb a minimum amount of energy per wave crest.

14. A wave energy conversion system, comprising:
   a float floating on a surface of a body of water having wave action the float moving with the wave action of the body of water;

a base, secured to resist movement from the wave action of the body of water;

a column, attached to the base and protruding from the surface of the body of water;

a machine room, attached to the float above the surface of the body of water so as to remain out of the body of water, the machine room including a power take-off for converting linear motion of the float into rotary motion;

at least one flap hanging from the float, the at least one flap moving back when hit by a wave incoming and forth when a wave has passed; and a linkage, attached to the at least one flap for extracting kinetic energy from the wave from the back and forth movement of the at least one flap through gears transmitting movement of the at least one flap to the power take off system in the machine room.

15. A wave energy conversion system, comprising:

a float floating on a surface of a body of water having wave action, the float moving with the wave action of the body of water;

a base, secured to resist movement from the wave action of the body of water;

a column, attached to the base and protruding from the surface of the body of water;

a machine room, attached to the float above the surface of the body of water so as to remain out of the body of water, the machine room including a power take-off for converting linear motion of the float into rotary motion;

at least one flap attached to the base, the at least one flap moving back when hit by a wave incoming and forth when a wave has passed; and a linkage, attached to the at least one flap for extracting kinetic energy from the wave from the back and forth movement of the at least one flap through gears transmitting movement of the at least one flap to the power take off system in the machine room.

16. A wave energy conversion system, comprising:

a float floating on a surface of a body of water having wave action, the float moving with the wave action of the body of water;

a base, secured to resist movement from the wave action of the body of water;

a column, attached to the base and protruding from the surface of the body of water;

a machine room, attached to the float above the surface of the body of water so as to remain out of the body of water, the machine room including a power take-off for converting linear motion of the float into rotary motion;

at least one flap attached to the beam, the at least one flap moving back when hit by a wave incoming and forth when a wave has passed; and a linkage, attached to the at least one flap for extracting kinetic energy from the wave from the back and forth movement of the at least one flap through gears transmitting movement of the at least one flap to the power take off system in the machine room.

* * * * *